(12) United States Patent
Takahashi et al.

(10) Patent No.: US 8,297,323 B2
(45) Date of Patent: Oct. 30, 2012

(54) PNEUMATIC TIRE

(75) Inventors: Fumio Takahashi, Kodaira (JP); Shu Fujiwara, Kawasaki (JP); Shu Nagai, Sayama (JP); Takanari Saguchi, Musashino (JP); Naoya Ochi, Higashimurayama (JP); Yukihiro Kiwaki, Higashimurayama (JP)

(73) Assignee: Bridgestone Corporation, Tokyo (JP)

( * ) Notice: Subject to any disclaimer, the term of this patent is extended or adjusted under 35 U.S.C. 154(b) by 266 days.

(21) Appl. No.: 12/527,667

(22) PCT Filed: Feb. 19, 2008

(86) PCT No.: PCT/JP2008/052776
§ 371 (c)(1),
(2), (4) Date: Mar. 15, 2010

(87) PCT Pub. No.: WO2008/102780
PCT Pub. Date: Aug. 28, 2008

(65) Prior Publication Data
US 2010/0175799 A1 Jul. 15, 2010

(30) Foreign Application Priority Data

| Feb. 19, 2007 | (JP) | 2007-037731 |
| Feb. 22, 2007 | (JP) | 2007-042684 |
| Mar. 1, 2007 | (JP) | 2007-051765 |
| Jun. 22, 2007 | (JP) | 2007-165474 |
| Jun. 29, 2007 | (JP) | 2007-172514 |
| Oct. 9, 2007 | (JP) | 2007-263611 |

(51) Int. Cl.
*B60C 11/12* (2006.01)
*B60C 11/13* (2006.01)
*B60C 11/04* (2006.01)

(52) U.S. Cl. ........... 152/209.3; 152/209.13; 152/209.19; 152/209.25; 152/209.28

(58) Field of Classification Search ..... 152/209.2–209.3
See application file for complete search history.

(56) References Cited

U.S. PATENT DOCUMENTS

| 6,681,824 B2 | 1/2004 | Lopez |
| 2007/0051448 A1 | 3/2007 | Yumii |
| 2009/0272474 A1* | 11/2009 | Nagai et al. ............... 152/209.18 |

FOREIGN PATENT DOCUMENTS

EP 1 964 691 A1 9/2008
(Continued)

OTHER PUBLICATIONS

English Language Machine Translation of JP10-006714, 1998.*
(Continued)

*Primary Examiner* — Justin Fischer
*Assistant Examiner* — Philip N Schwartz
(74) *Attorney, Agent, or Firm* — Sughrue Mion, PLLC

(57) ABSTRACT

The present invention provides a pneumatic tire having: a circumferential groove continuously extending in the tire circumferential direction in a ground contact surface of a tread portion; and a resonator provided in a land portion and constituted of a resonance cell portion opened to a ground contact region at a position distanced from the circumferential groove and a siping portion making the resonance cell portion communicate with the circumferential groove, wherein change in a tread pattern as time lapses can be alleviated without scarifying an effect of reducing pipe resonance sounds. Specifically, an opening width of the siping portion at the ground contact surface of the tread portion is designed to change in the longitudinal direction thereof such that the opening with is relatively narrow on the side of the circumferential groove and relatively wide on the side of the resonance cell portion.

10 Claims, 33 Drawing Sheets

FOREIGN PATENT DOCUMENTS

| | | | |
|---|---|---|---|
| JP | 05-254311 A | 10/1993 | |
| JP | 05-338411 A | 12/1993 | |
| JP | 10-006714 A | 1/1998 | |
| JP | 10-287108 A | 10/1998 | |
| JP | 2000-118207 A | 4/2000 | |
| JP | 2001-191734 A | 7/2001 | |
| WO | 2004/103737 A1 | 12/2004 | |
| WO | 2007/072824 A1 | 6/2007 | |
| WO | WO2007072824 | * | 6/2007 |

OTHER PUBLICATIONS

English Language Machine Translation of JP2000-118207, 2000.*
International Search Report PCT/JP2008/052776, May 27, 2008.
Supplementary European Search Report issued in European Application No. 08720751.0-2425 / 2127909 dated Dec. 23, 2010 (5 pages).
Korean Office Action issued in Korean Application No. 10-2009-7019483 dated Apr. 12, 2011 (7 pages).
Chinese Office Action issued in Chinese Application No. 200880012494.8, dated Jul. 12, 2011.
Japanese Office Action issued in the corresponding Japanese Application No. 2007-165474 dated Jun. 12, 2012.
Japanese Office Action issued in the corresponding Japanese Application No. 2007-172514 dated Jun. 12, 2012.
Japanese Office Action issued in the corresponding Japanese Application No. 2007-263611 dated Jun. 12, 2012.

* cited by examiner (a)

(b)

PNEUMATIC TIRE

CROSS REFERENCE TO RELATED APPLICATIONS

This application is a National Stage of International Application No. PCT/JP2008/052776 filed Feb. 19, 2008, claiming priority based on Japanese Patent Application Nos. 2007-037731, 2007-042684, 2007-051765, 2007-165474, 2007-172514 and 2007-263611, filed Feb. 19, 2007, Feb. 22, 2007, Mar. 1, 2007, Jun. 22, 2007, Jun. 29, 2007 and Oct. 9, 2007, respectively, the contents of all of which are incorporated herein by reference in their entirety.

TECHNICAL FIELD

The present invention relates to a pneumatic tire having a resonance cell for suppressing pipe resonance of a circumferential groove.

PRIOR ART

In recent years, as vehicles in general become relatively quiet, vehicle noises caused by rotation of a pneumatic tire with load exerted thereon are becoming a large factor of vehicle noises accordingly, and there is a demand to reduce such noises caused by a tire. Tire noises at a relatively high frequency, in particular, around 1000 Hz have been a main cause of vehicle exterior noise and there has been a demand to reduce such tire noises, to address environmental issues, as well.

The tire noises around 1000 Hz are generated mainly due to a pipe resonance sound. A pipe resonance sound is a noise generated by resonance of air in a tube defined by a circumferential groove continuously extending in the tire circumferential direction in a ground contact surface of a tread portion and a road surface. In vehicles in general, a columnar noise is normally generated in the range of 800 to 1200 Hz and a columnar noise in this frequency range constitutes, due to a relatively high peak sound pressure level and a relatively wide frequency range, the most part of noises generated by a pneumatic tire.

Further, since human hearing is especially sensitive to noises in a frequency range around 1000 Hz (A characteristic), reducing a pipe resonance sound in the aforementioned frequency range is effective in terms of improving quietness felt by occupants during running of a vehicle.

Therefore, in order to decrease such a pipe resonance sound as described above, the provision number and/or the volume of circumferential groove is generally reduced. Further, as one of the methods of decreasing a pipe resonance sound, there has been proposed a technique, in which a resonator is provided to open to the circumferential groove and terminate in a land portion and thus constitute a Hemholz-type resonator including a resonance cell portion opening to a ground contact region and a siping portion for making the resonance cell portion communicate with the circumferential groove, so that energy of a pipe resonance sound around the resonance frequency is absorbed (e.g. JP 05-338411, JP 2000-118207 and JP 2001-191734). Other examples of the proposed method of decreasing a pipe resonance sound include decreasing a pipe resonance sound by using antiresonance in a long lateral groove provided such that only one end thereof opens to the circumferential groove and the other end terminates in a land portion, as disclosed in WO 04/103737. Further, in general, as a technique for ensuring good drainage properties even in a worn tire, there has been practiced to shape a section of a sipe to a flask-like shape.

DISCLOSURE OF THE INVENTION

However, in the prior art described above, the siping portion is designed to have a constant opening width in the entire length thereof from the circumferential groove to the resonance cell portion. In this structure, rigidity of a land portion in which the siping portion is formed is larger on the side of the resonance cell portion thereof reaching the resonance cell portion and surrounded by a land portion than on the side of the circumferential groove thereof teaching the circumferential groove extending in the circumferential direction. It is known that the larger difference in rigidity of the land portion between the two sides described above results in the larger striking sounds when the land portion hits the ground. Therefore, there has been a demand to suppress a striking sound caused by difference in rigidity described above.

The present invention has been made in view of the problems described above, and an object thereof is to provide a tire which is capable of suppressing striking sounds during running of a tire, without sacrificing an effect of reducing a pipe resonance sound.

In order to achieve the aforementioned object, a pneumatic tire of the present invention, having: a circumferential groove continuously extending in the tire circumferential direction in a ground contact surface of a tread portion; and a resonator provided in a land portion and constituted of a resonance cell portion opened to a ground contact region at a position distanced from the circumferential groove and a siping portion for making the resonance cell portion communicate with the circumferential groove, is characterized in that an opening width of the siping portion at the ground contact surface of the tread portion is designed to change in the longitudinal direction thereof such that the opening width is relatively narrow on the side of the circumferential groove and relatively wide on the side of the resonance cell portion. In general, in a case where the siping portion has a constant opening width in the longitudinal direction thereof, the rigidity of the land portion in the vicinity of the siping is smaller on the side of the circumferential groove than on the side of the resonance cell portion, whereby a striking sound is generated due to the difference in rigidity between the two side of the land portion when the siping portion is brought into contact with the ground during tire rotation with load exerted thereon. According to the present invention, however, by designing the opening width of the siping portion opened to a ground contact surface of the tread portion to be wider on the resonance cell side than on the circumferential groove side thereof, the difference in rigidity of the land portion in the vicinity of the siping portion between the two sides thereof is reduced, so that striking sounds caused by the difference in rigidity can be suppressed. In the present invention, the term "circumferential groove" represents not only a groove linearly extending along the tire circumferential direction but also a groove extending in the tire circumferential direction in a zigzag or wavy manner to form a complete circumferential groove as a whole.

The type of the resonator is not particularly limited. For example, the resonator may be a Helmholz-type resonator. In this case, the formula for obtaining the resonance frequency $f_0$ is expressed as below, given that the resonator has a shape as shown in FIG. 1 and the radius, the length and the sectional area of the siping 2, the volume of the resonance cell 3 and the speed of sound are expressed as r, $l_0$, S, V and c, respectively.

$$f_0 = \frac{c}{2\pi}\sqrt{\frac{S}{(l_0+1.3r)V}}$$

The correction of the end of the siping 2 in the formula above is normally obtained by experiments and thus the value thereof varies depending on the references. In the present invention, 1.3r is used as the correction value. In the present invention, in a case where a sectional shape of the siping 2 is not circular, r, calculated by assuming that the section of the siping 2 were to have a circular shape of the same sectional area, is used. Accordingly, the resonance frequency $f_0$ of the resonator 1 can be changed according to necessity by appropriately selecting the values of the sectional area S of the siping 2, the volume V of the resonance cell 3 and the like.

Further, as shown in FIG. 2, the resonance cell 3 and the siping 2 of the resonator 1 can be regarded as a first tubular path 4 and a second tubular path 5, respectively. That is, the resonator 1 can be designed as a stepped resonator, which is a linked tubular path formed by linking the first tubular path and the second tubular path. In this case, the resonance frequency $f_0$ can be obtained as follows.

Provided that a sectional area orthogonal to the extending direction of the first tubular path is $S_1$, a sectional area orthogonal to the extending direction of the second tubular path is $S_2$, acoustic impedance on the first tubular path 4 side at the boundary is $Z_{12}$, and acoustic impedance on the second tubular path 5 side at the boundary is $Z_{21}$, the following formula is deduced from the condition of continuity.

$$Z_{21}=(S_2/S_1)\cdot Z_{12}$$

The sound pressure $P_2$ at a position on the second tubular path 5, which position is away from the portion of the second tubular path opened to the circumferential groove by a distance x, is obtained by the following formula, provided that the boundary conditions are: $V_2=V_0 e^{jwt}$ when x=0; and $P_2/V_2=Z_2$ when $x=l_2$, $$P_2=Z_S\cdot\{Z_{21}\cos(k(l_2-x))+jZ_c\sin(k(l_2-x))/Z_c\cos(kl_2)+jZ_{21}\sin(kl_2)\}\cdot V_0 e^{jwt}, \text{ (note that } k=2\pi f_0/c)$$

wherein $V_2$ represents the particle velocity distribution of the second tubular path 5, $V_0$ represents the particle velocity at the input point, j represents the imaginary unit and Zc represents ρc (ρ: air density, c: the speed of sound), respectively. The sound pressure $P_1$ at the first tubular path 4 is obtained by the following formula, provided that the boundary conditions are: $V_1=0$ when $x=l_1$; and $P_2/V_2=Z_{21}$ when $x=l_2$, $$P_1=Z_S\cdot\{Z_{21}\cos(k(l_2-x))/\cos(kl_1)\cdot\{Z_0\cos(kl_2)+jZ_{21}\sin(kl_2)\}\}\cdot V_0 e^{jwt}$$

Accordingly, the condition formula of the resonance frequency $f_0$ is deduced as follows, provided that the condition of resonance is: $P_2=0$ when x=0. The resonance frequency $f_0$ can be calculated by selecting k, $l_1$, $l_2$, $S_2$, $S_1$, c, based on this condition formula of resonance.

$$\mathrm{Tan}(kl_1)\tan(kl_2)-(S_2/S_1)=0$$

Further, it is preferable that, provided that the length in the tire circumferential direction and the length in the tire widthwise direction of the resonance cell portion of the resonator are $L_3$ and $L_4$, respectively, $L_4$ is not larger than $L_3$.

Yet further, the ground contact surface of the tread portion is preferably provided with at least one shoulder groove extending from the circumferential groove toward the outer side in the tire widthwise direction thereof to a position beyond a ground contact end of the tread.

Yet further, it is preferable that the sectional area of a face of the resonance cell portion, which face is orthogonal to the extending direction of the resonance cell portion, is larger than the sectional area of a face of the siping portion, which face is orthogonal to the extending direction of the siping portion, and that the siping portion has on the groove bottom side thereof an enlarged portion having a larger groove width than the opening width of the siping portion. In the present invention, a "groove width" represents a measured length of a sectional width at a section of the siping portion, which section is orthogonal to the extending direction of the siping and the "extending direction of the siping" represents an extending direction of the siping which extends from the circumferential groove toward the resonance cell portion.

Yet further, a sectional area of a face of the resonance cell portion, which face is orthogonal to the extending direction of the resonance cell portion, is larger than a sectional area of a face of the siping portion, which face is orthogonal to the extending direction of the siping portion, and that the depth of the resonance cell portion is not larger than the width of the resonance cell portion at the ground contact surface of the tread portion. In the present invention, a "depth of the resonance cell portion" represents a distance in the tire radial direction from a ground contact surface of the tread portion to the groove bottom of the resonance cell portion and a "width of the resonance cell portion" represents a width in the direction orthogonal to the longitudinal direction of the resonance cell portion, i.e. the width in the lateral direction. It should be noted that the length of the resonance cell portion represents the length in the longitudinal direction of the resonance cell portion.

Yet further, it is preferable that the pneumatic tire further comprises: at least one row of rib-like land portions adjacent to the circumferential groove, wherein a plurality of the resonators are provided along the tire circumferential direction in the rib-like land portion, and each resonator has a first end and a second end defining a length in the tire circumferential direction of the resonance cell portion, the siping portion extends from the second end of the resonator in the direction away from the first end of the resonator, and the first end of one resonator and the second end of another resonator adjacent to the one resonator in the tire circumferential direction are aligned with each other on the same line in the tire widthwise direction.

Yet further, it is preferable that, when viewed in the tire widthwise direction, the resonance cell portion of one resonator at least partially overlaps the siping portion of another resonator adjacent to the one resonator in the tire circumferential direction.

Yet further, it is preferable that the sectional area in the tire widthwise direction of the resonance cell portion gradually decreases toward the first end of the resonator.

According to the present invention, since the opening width of the siping portion at a ground contact surface of the tread portion is designed to change in the longitudinal direction of the siping portion such that the opening width is relatively small on the circumferential groove side and relatively large on the resonance cell portion side of the siping, i.e. the land portion area is made larger on the circumferential groove side than on the resonance cell portion side, the rigidity of the land portion, which would be lower on the circumferential groove side than on the resonance cell portion side if the siping were to have a constant opening width in the longitudinal direction thereof, can be designed not so much different between the circumferential groove side and the resonance cell portion side, whereby striking sounds can be suppressed.

Figure 1:
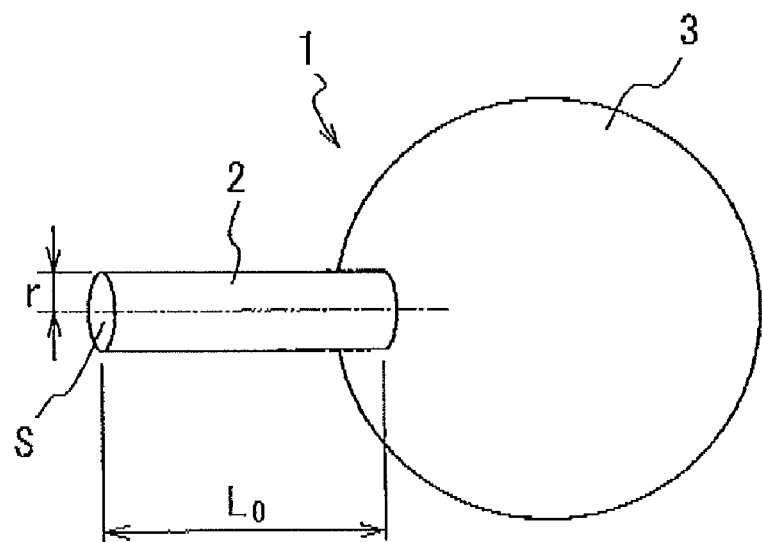
FIG. 1 is a view schematically showing a Helmholz-type resonator.
Figure 2:
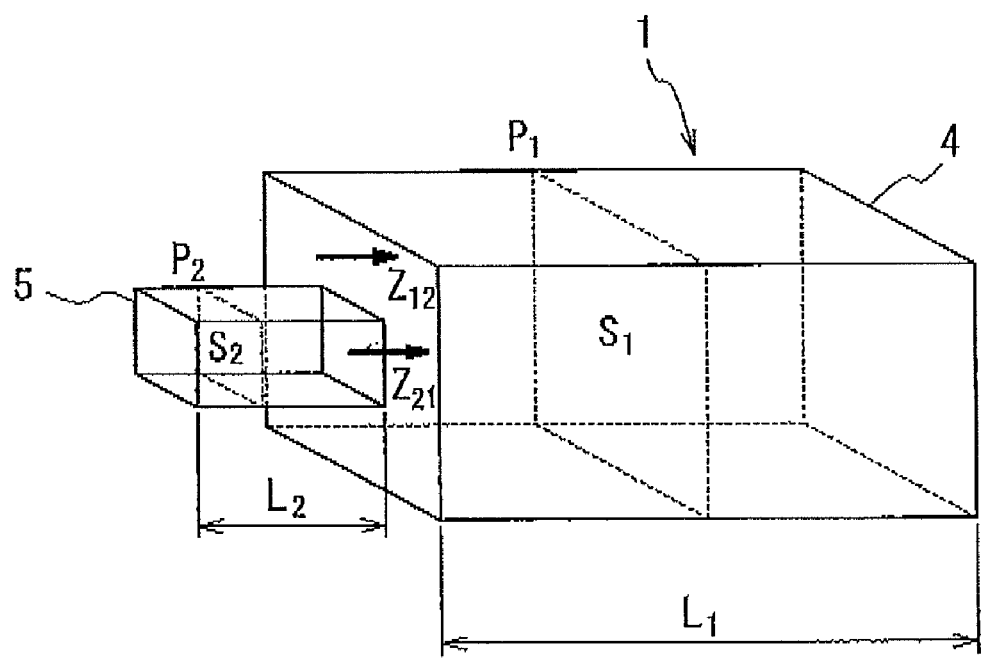
FIG. 2 is a view schematically showing a stepped-type resonator.

| Explanation of Reference Numerals | |
|---|---|
| 1 | Resonator |
| 2 | Siping portion |
| 3 | Resonance cell portion |
| 4 | First tubular path |
| 5 | Second tubular path |
| 6 | Land portion |
| 7 | Circumferential groove |
| 8a | Portion of siping portion on circumferential groove side |
| 8b | Portion of siping portion on resonance cell portion side |
| 9 | Shoulder land portion |
| 10 | Center land portion |
| 11 | Center land portion |
| 12 | Groove bottom of resonance cell portion |
| 13 | Projection |
| 14 | Ground contact end of tread |
| 15 | Shoulder groove |
| 16 | Land portion on the inner side in the tire widthwise direction of circumferential groove |
| 17 | Enlarged portion |
| 18 | Constant groove width portion |
| 19 | Wall portion of resonance cell portion |
| 20 | Pebble or gravel |
| 21 | Extending direction of wall portion of resonance cell portion |
| 22 | Line normal to ground contact surface of tread portion |
| 23 | Rib-like land portion |
| 24 | First end |
| 25 | Second end |
| 26 | Opening end |

BEST MODE FOR CARRYING OUT THE INVENTION

Figure 3:
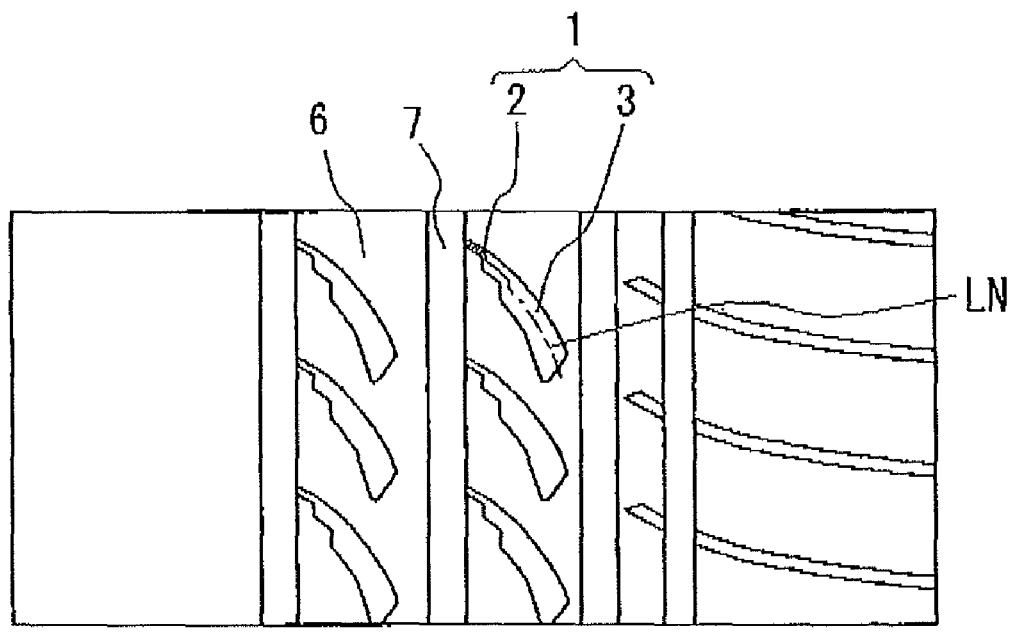
FIG. 3 is a plan view showing a ground contact surface of a representative tire according to the present invention.
Figure 4:
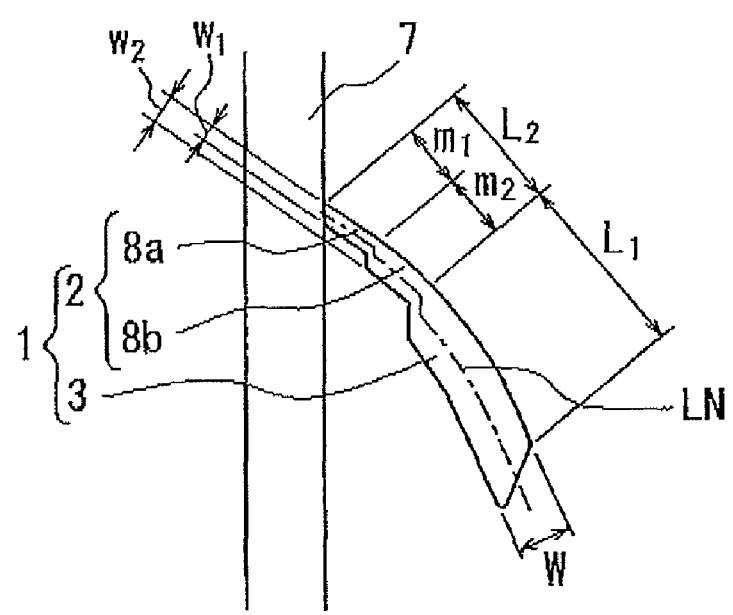
FIG. 4 is a plan view of a resonator of the tire shown in FIG. 3.
Figure 5:
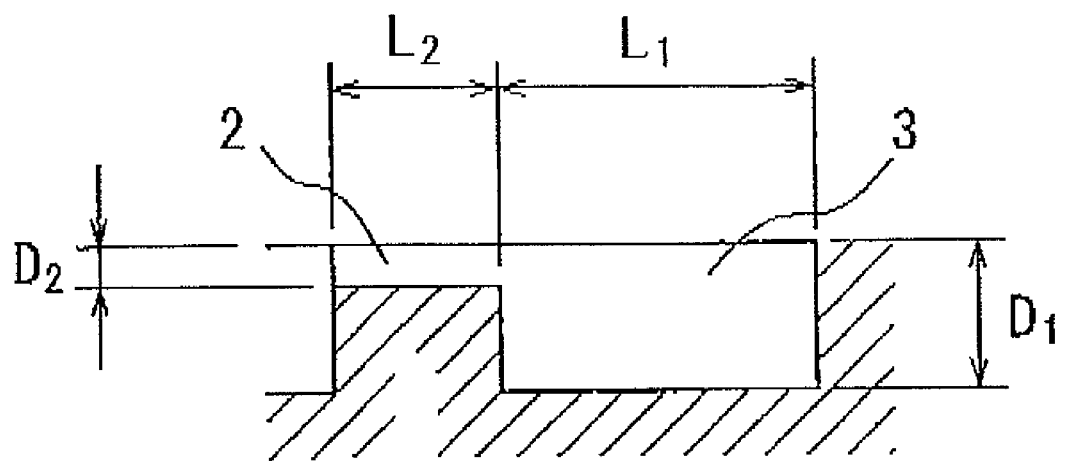
FIG. 5 is a sectional view of a resonator of the tire shown in FIG. 3.
Figure 6:
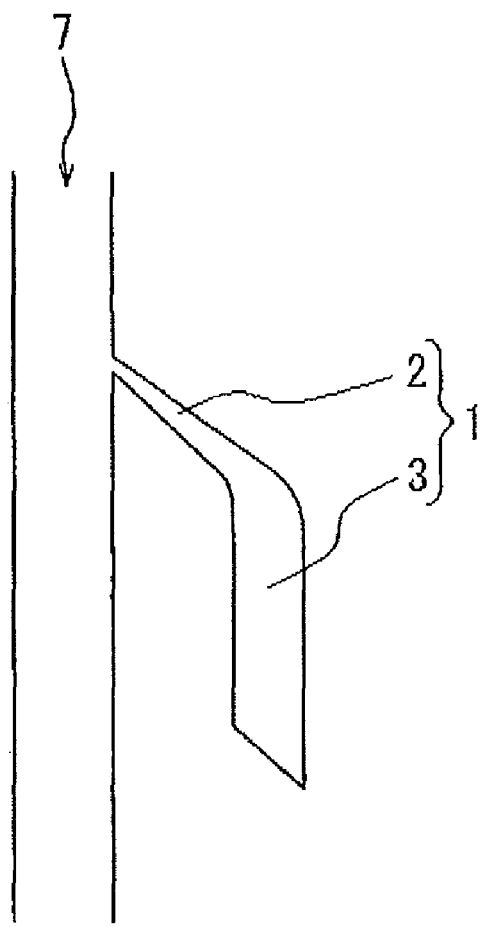
FIGS. 6(a) and 6(b) are plan views of resonators of other tires according to the present invention, respectively.
Figure 6:
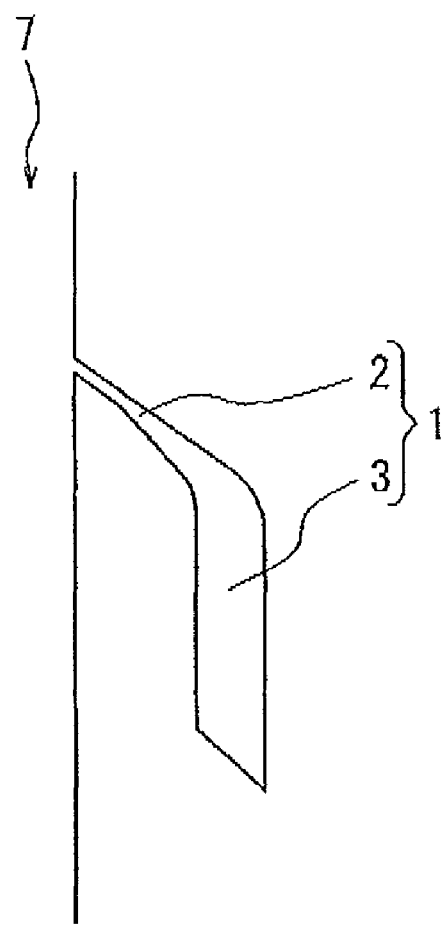
Figure 7:
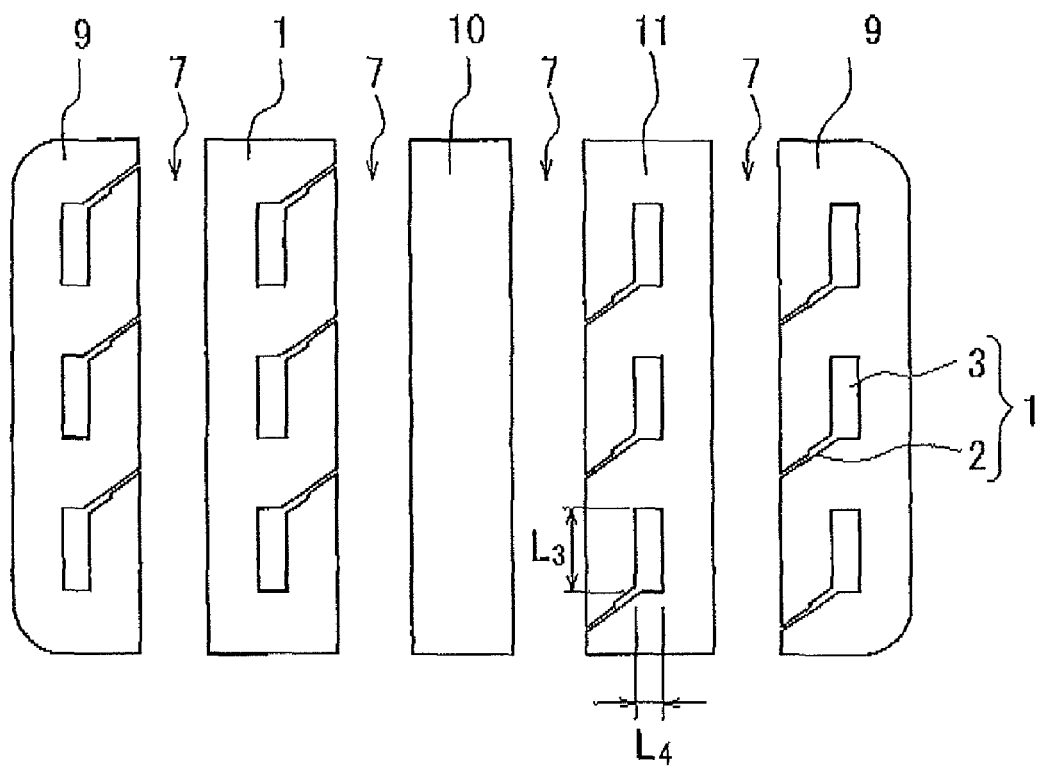
FIG. 7 is a development view of a part of a tread portion of another tire according to the present invention.
Figure 8:
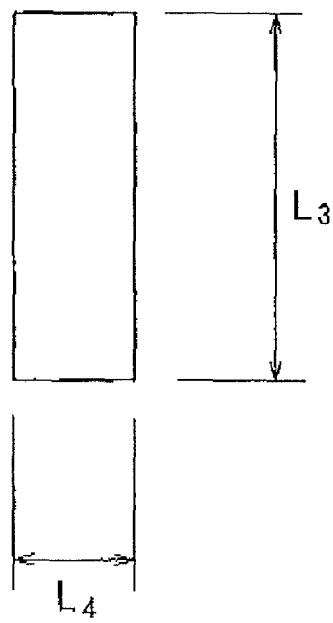
FIGS. 8(a) and 8(b) are plan views each showing an opening portion of the resonance cell portion.
Figure 8:
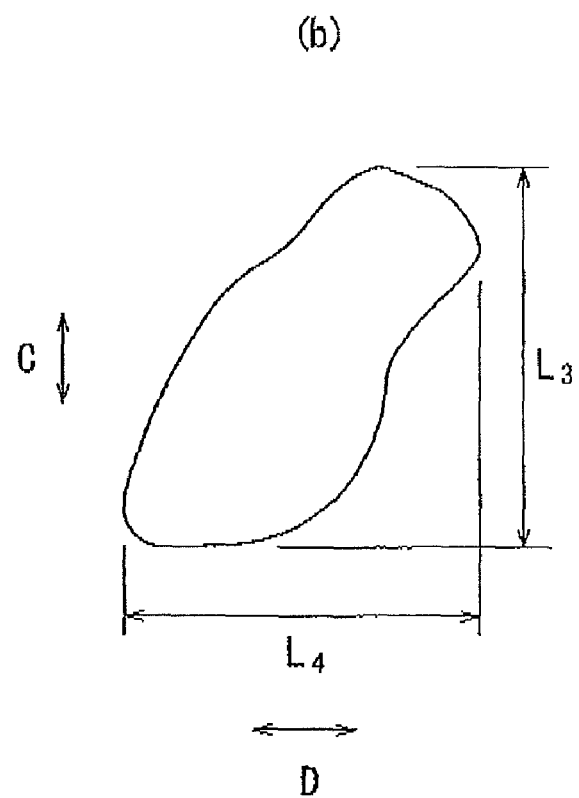
Figure 9:
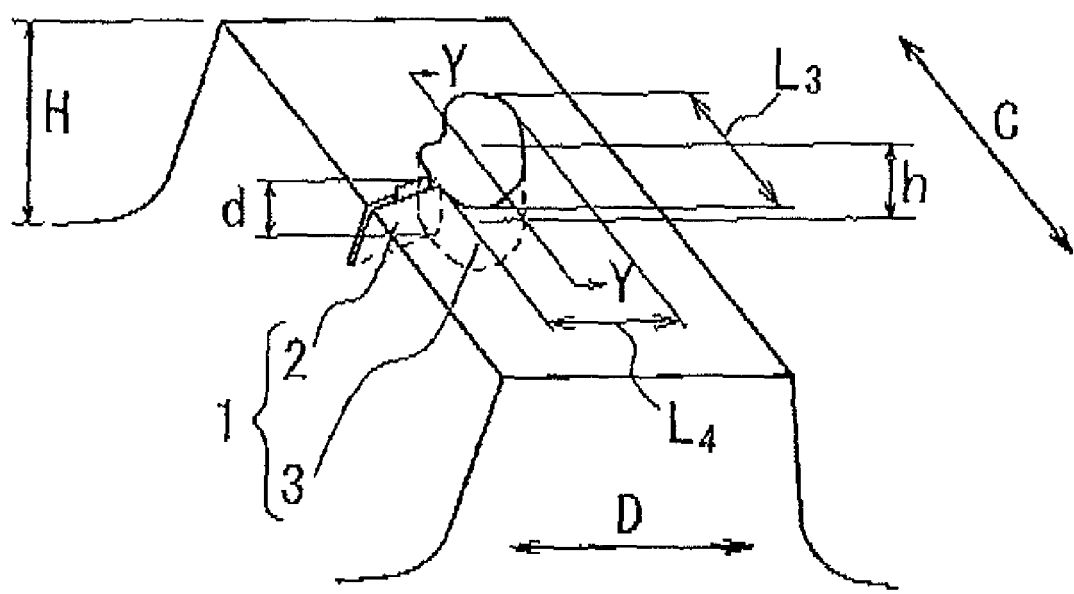
FIG. 9 is a partial perspective view of yet another tire according to the present invention.
Figure 10:
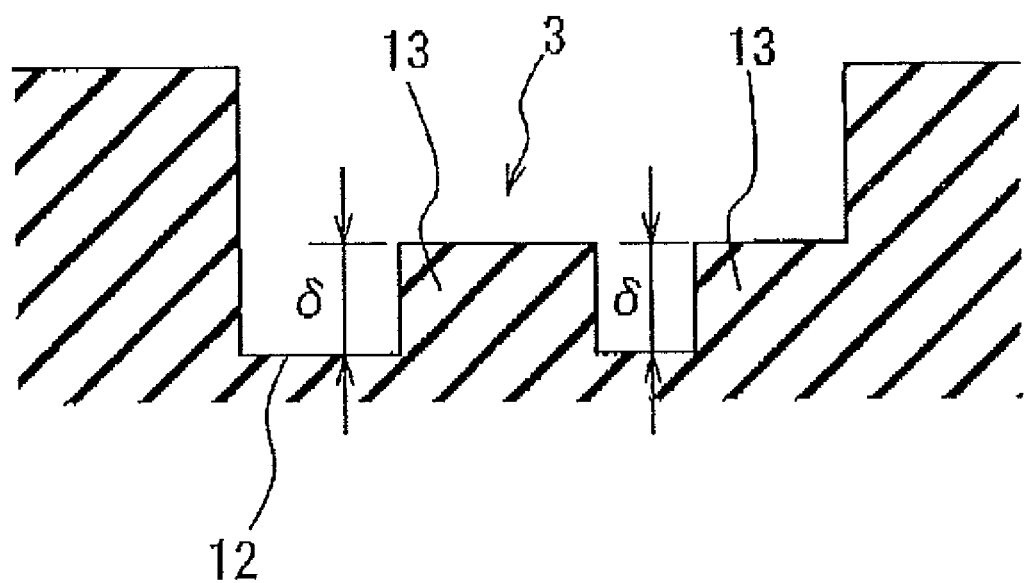
FIG. 10 is a sectional view of the tire of FIG. 9, cut along the Y-Y line in FIG. 9.
Figure 11:
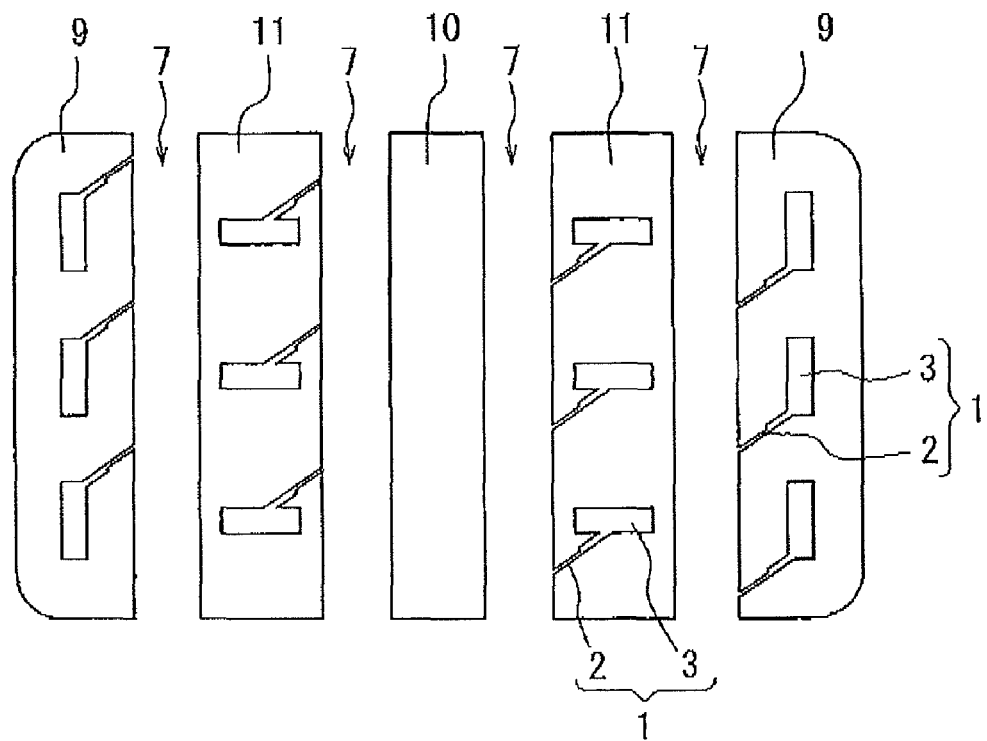
FIG. 11 is a development view of a part of a tread portion of yet another tire according to the present invention.
Figure 12:
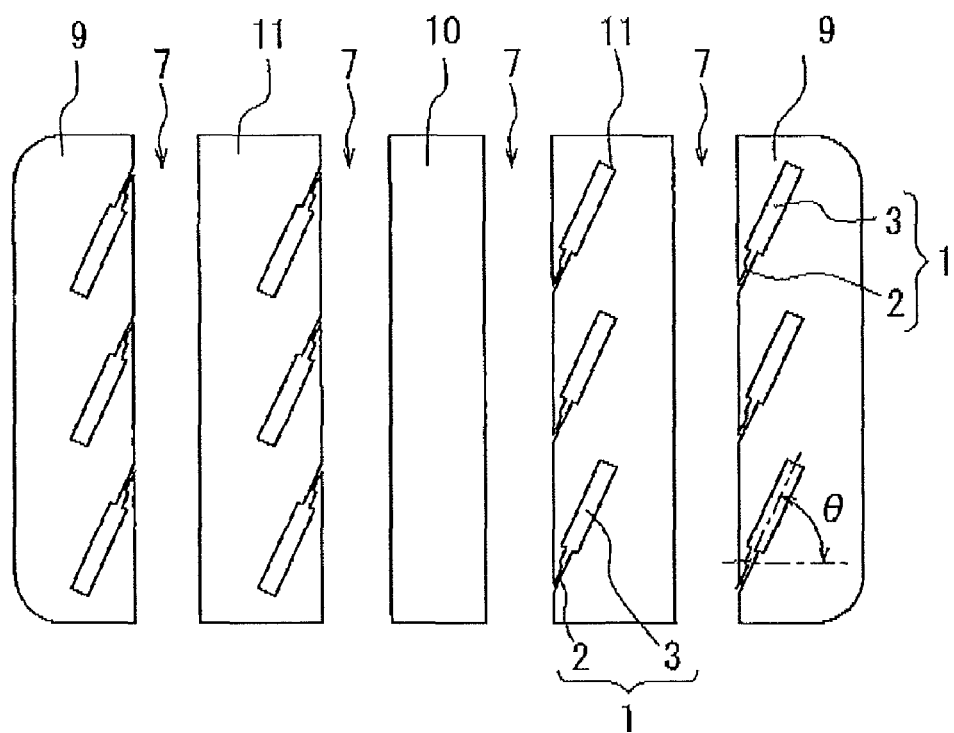
FIG. 12 is a development view of a part of a tread portion of yet another tire according to the present invention.
Figure 13:
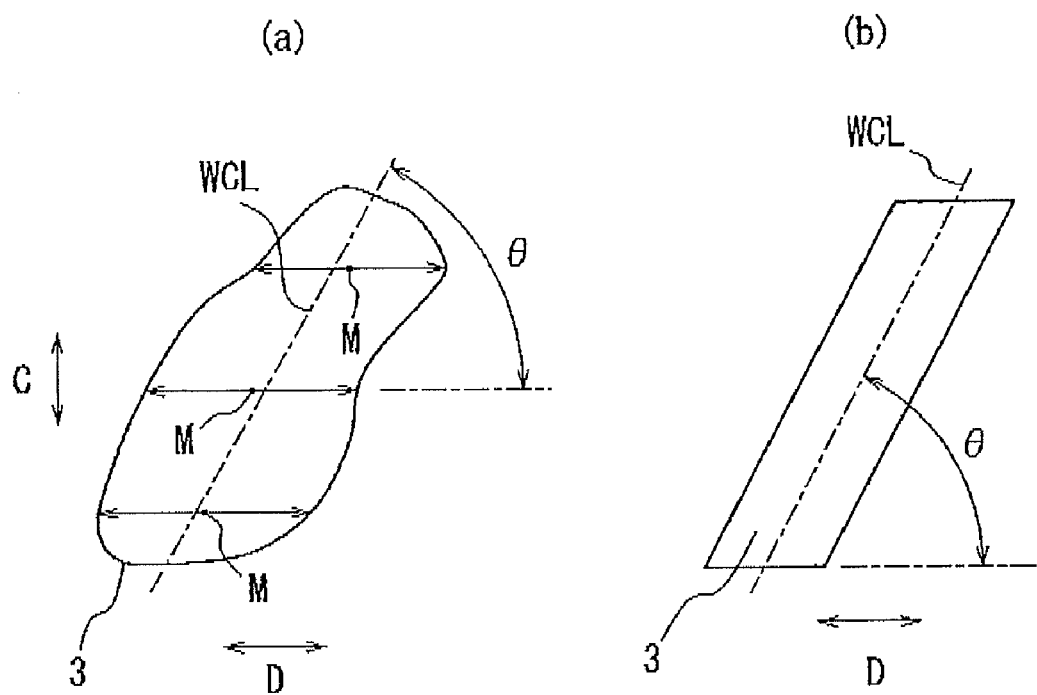
FIG. 13 is a plan view showing an opening portion of the resonance cell portion.
Figure 14:
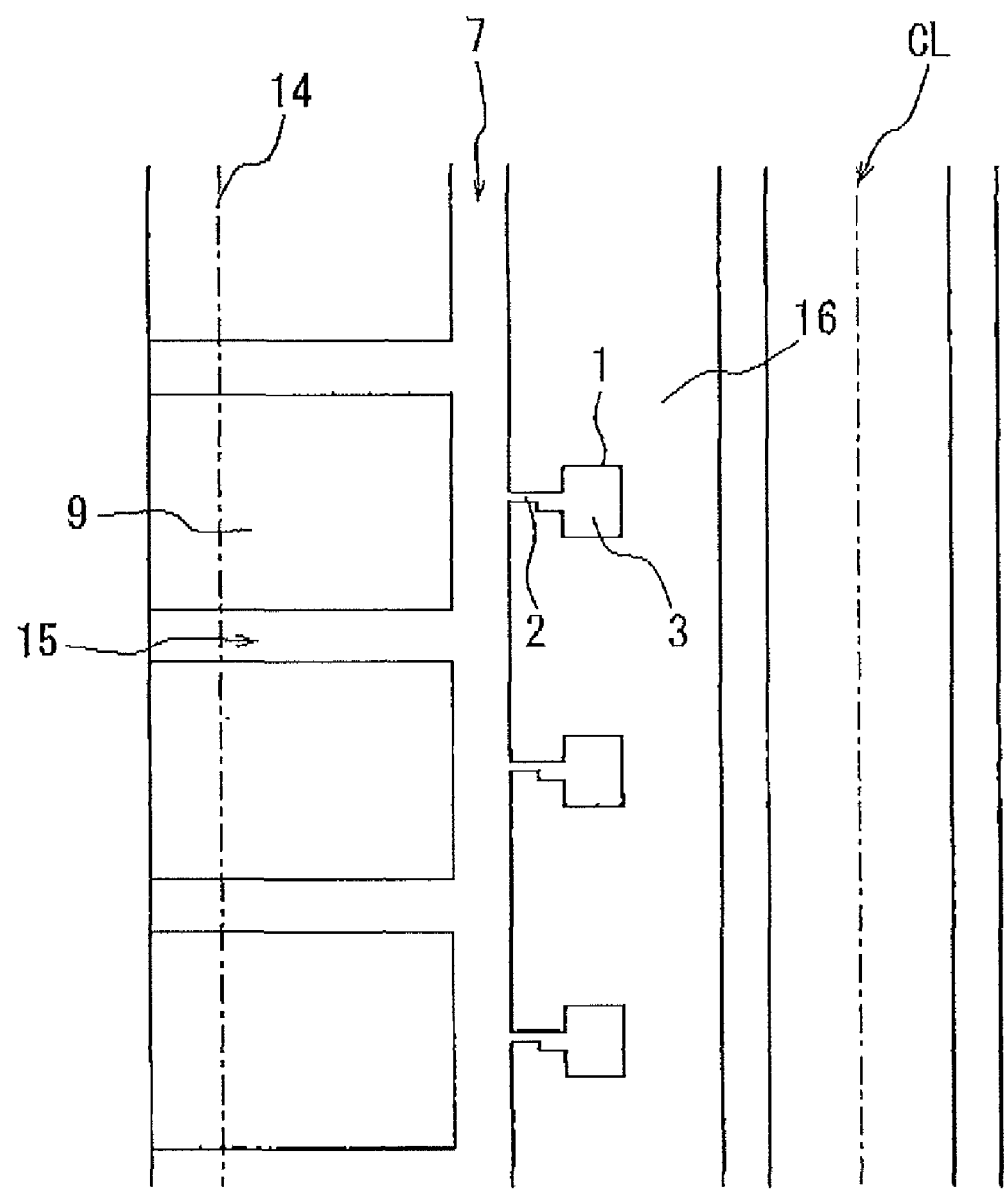
FIG. 14 is a development view of a part of a tread portion of yet another tire according to the present invention.
Figure 15:
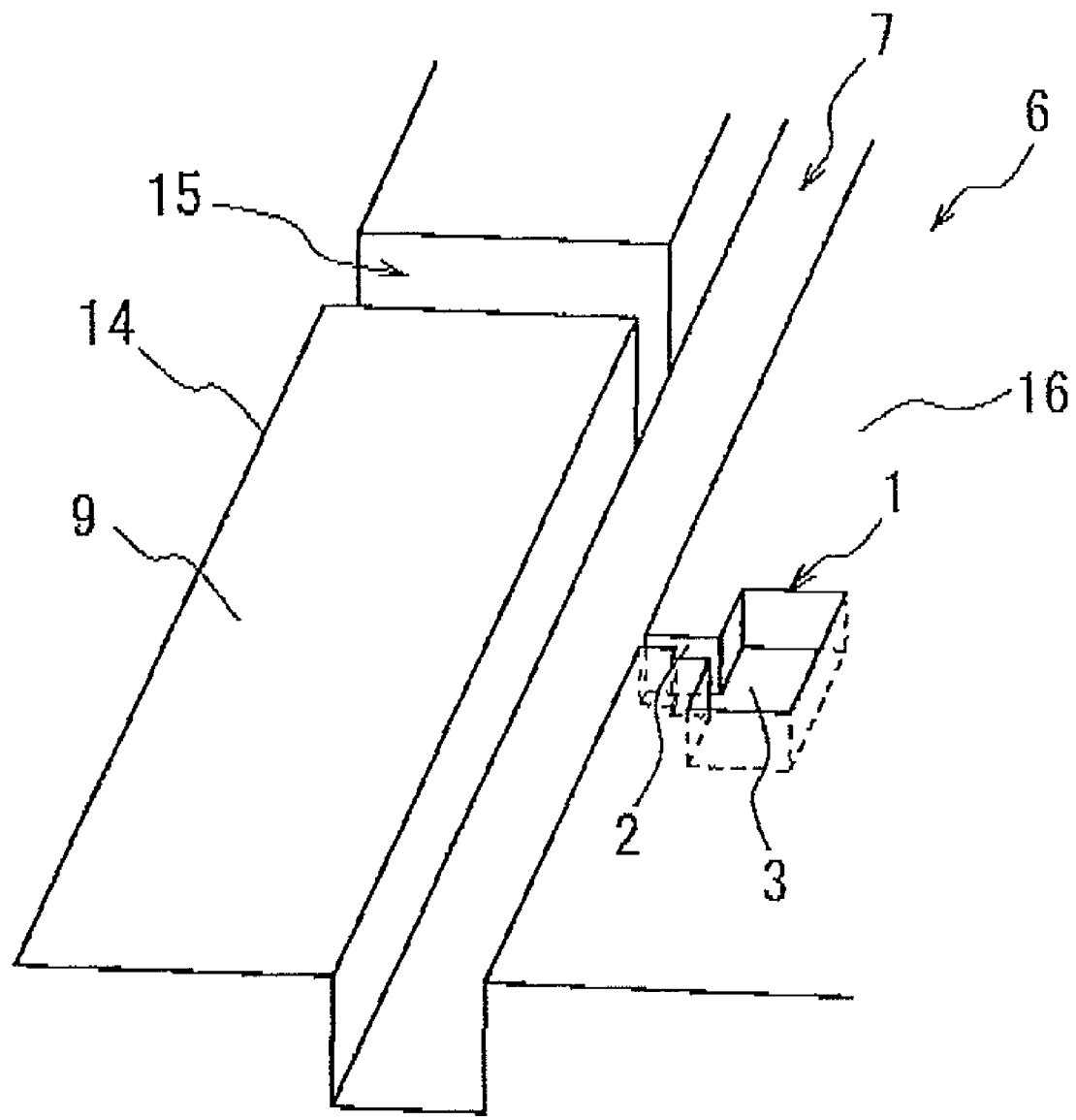
FIG. 15 is a perspective view of a part of the tread portion of the tire shown in FIG. 14.
Figure 16:
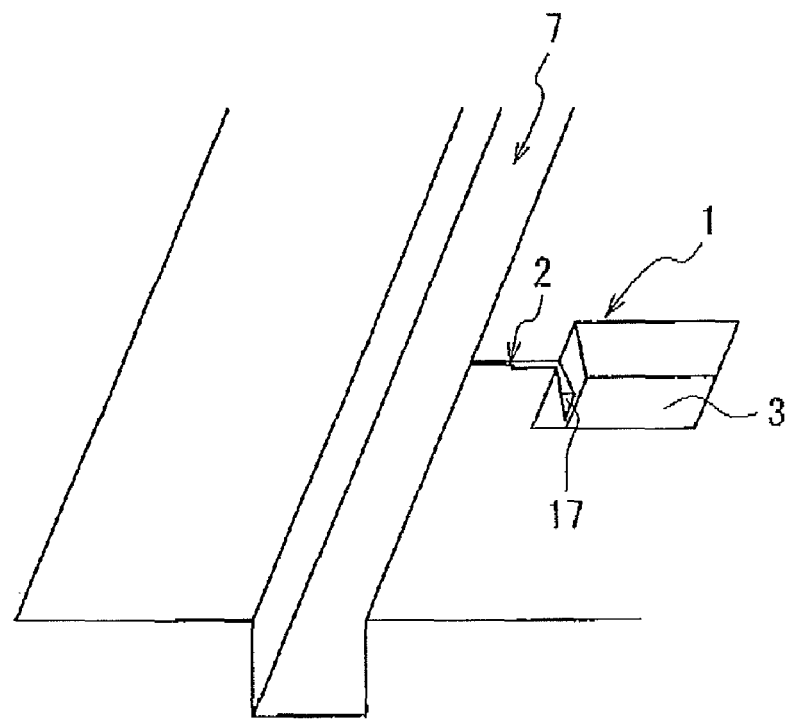
FIG. 16 is a perspective view of a part of a tread portion of yet another tire according to the present invention.
Figure 17:
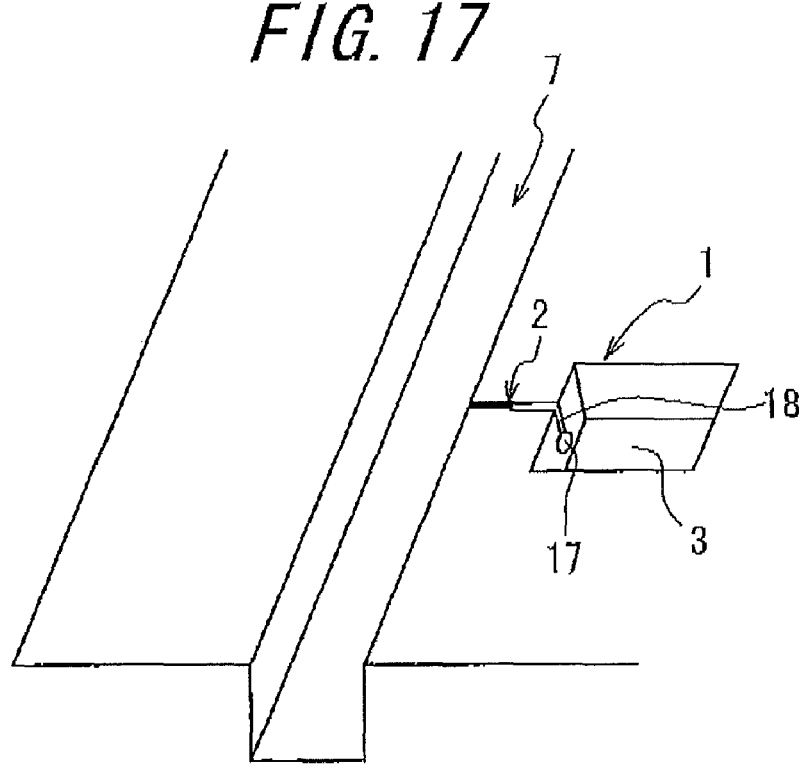
FIG. 17 is a perspective view of a part of a tread portion of yet another tire according to the present invention.
Figure 18:
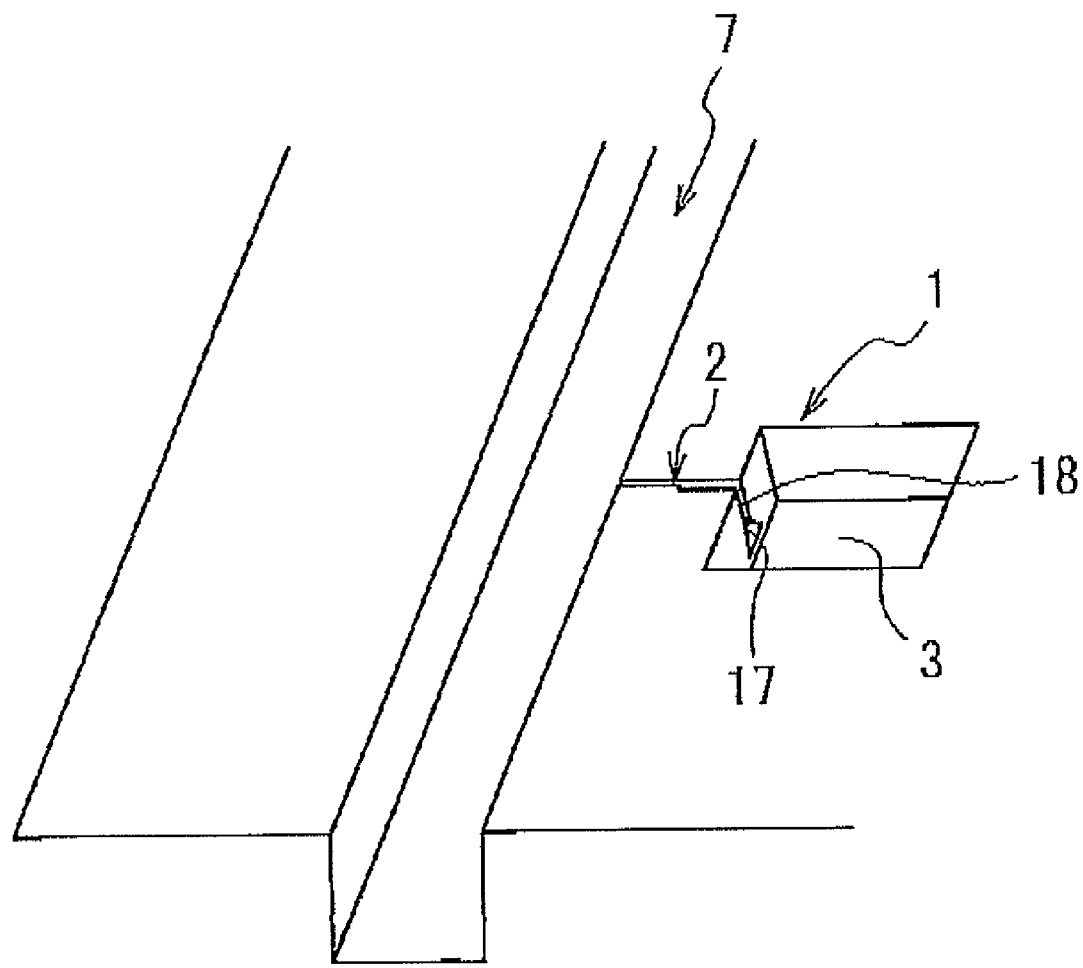
FIG. 18 is a perspective view of a part of a tread portion of yet another tire according to the present invention.

A tire of an embodiment of the present invention will be described with reference to the drawings. FIG. 3 is a plan view showing a ground contact surface of a tread portion of a representative pneumatic tire according to the present invention (which tire will be simply referred to as "tire" hereinafter), assembled with a prescribed rim and in a state where the tire is inflated at the maximum air pressure and a mass corresponding to the maximum load capacity thereof is applied thereon. FIG. 4 is a plan view of a resonator of the tire shown in FIG. 3. FIG. 5 is a L-N line sectional view of the resonator of FIG. 4, cut along the widthwise direction center line LN thereof. FIGS. 6(a) and 6(b) are plan views of resonators of other tires according to the present invention, respectively. FIG. 7 is a development view of a part of a tread portion of another tire according to the present invention, assembled with a prescribed rim and in a standard state in which the tire is inflated at the maximum air pressure and load corresponding to 80% of the prescribed mass is exerted thereon. FIGS. 8(a) and 8(b) are plan views each showing an opening portion of the resonance cell portion. FIG. 9 is a partial perspective view of yet another tire according to the present invention. FIG. 10 is a sectional view of the tire of FIG. 9, cut along the Y-Y line in FIG. 9. FIG. 11 is a development view of a part of a tread portion of yet another tire according to the present invention. FIG. 12 is a development view of a part of a tread portion of yet another tire according to the present invention. FIG. 13 is a plan view showing an opening portion of the resonance cell portion. FIG. 14 is a development view of a part of a tread portion of yet another tire according to the present invention. FIG. 15 is a perspective view of a part of a tread portion of the tire shown in FIG. 14. FIGS. 16 to 18 are perspective views each showing a part of a tread portion of yet another tire according to the present invention. FIGS. 19, 20 and 22 to 24 are development views each showing a part of a tread portion of yet another tire according to the present invention. FIG. 21 is a sectional view in the tire widthwise direction of the resonance cell portion shown in FIG. 20. FIGS. 25 to 30 are enlarged plan views each showing, in an enlarged manner, a main part of a tread portion of yet another tire according to the present invention.

In the present invention, a "prescribed rim" represents a rim prescribed in the Standards described below, "the maximum air pressure" represents the air pressure prescribed in accordance with the maximum load capacity in the Standards described below, a "prescribed air pressure" represents the air pressure prescribed in accordance with the maximum load capacity in the Standards described below, "the maximum load capacity" represents the maximum mass which is allowed to be exerted on a tire according to the Standards described below, and a "prescribed mass" represents the aforementioned maximum load capacity. In the present invention, "air" may be replaced with an inert gas such as nitrogen gas, or the like.

In the present invention, a "Standard" represents a standard determined by an industrial standard effective in an area where the tire is produced or used. Examples of such a standard as described above include "YEAR BOOK" by THE TIRE AND RIM ASSOCIATION, INC. in the United States, "STANDARDS MANUAL" by The European Tyre and Rim Technical Organisation in Europe and "JATMA YEAR BOOK" by The Japan Automobile Tyre Manufacturers Association, Inc. in Japan.

The tire shown in FIG. 3 according to the present invention has: a circumferential groove 7 continuously extending in the tire circumferential direction in a ground contact surface 6 of a tread portion; and a resonator 1 provided in a land portion 6 and constituted of a resonance cell portion 3 opened to the circumferential groove 7 and also opened to a ground contact surface at a position distanced from the circumferential groove 7 and a siping portion for making the resonance cell portion 3 communicate with the circumferential groove. The pneumatic tire of the present invention is characterized in that an opening width of the siping portion 2 is designed to change in the longitudinal direction, i.e. in a direction along the center line LN plotted by linking the middle points of the widths of the resonator 1. FIG. 4 is a plan view showing an opening portion of the resonator 1. FIG. 5 is a sectional view schematically showing a section of the resonator 1 cut along the widthwise direction center line LN. In this example, the resonator 1 is constituted of the resonance cell portion 3 having a width W, a length $L_1$ and a depth $D_1$ and the siping portion 2 having a length $L_2$ and a depth $D_2$. The siping portion 2 includes a portion thereof 8a on the circumferential groove side having an opening width $w_1$ and a length $m_1$ and a portion thereof 8b on the resonance cell portion side having an opening width $w_2$ and a length $m_2$, wherein the opening width $w_1$ is smaller than the opening width $w_2$. Although the opening width of the siping portion 2 changes the length thereof in two steps in the resonator 1 shown in FIG. 3, the opening width of the siping 2 may be gradually increased from the circumferential groove side toward the resonance cell portion side, as shown in FIG. 6(a). Further, as shown in FIG. 6(b), the siping portion 2 may be constituted of a portion having a constant opening width on the circumferential groove side and a portion where the groove width gradually increases from the aforementioned constant opening width portion toward the resonance cell portion side.

In general, in a case where the opening width of the siping portion 2 is constant, rigidity of a land portion in the vicinity of the siping portion is smaller on the circumferential groove side than on the resonance cell portion side thereof, whereby striking sounds are generated due to the uneven distribution of rigidity of the land portion and the noise during running of a vehicle becomes relatively loud. Therefore, by making the opening width of the siping 2 relatively small on the circumferential groove side and relatively large on the resonance cell side as in the resonator 1 of the tire according to the present invention, rigidity of the land portion can be made substantially even between the circumferential groove side and the resonance cell portion side thereof, whereby difference in rigidity between the two sides of the land portion is reduced and thus striking sounds, generated when the tire is rotated with load exerted thereon and brought into contact with a road surface, can be decreased.

Further, it is preferable that, provided that the length in the tire circumferential direction and the length in the tire widthwise direction of the resonance cell portion 3 of the resonator 1 are $L_3$ and $L_4$, respectively, $L_4$ is not larger than $L_3$. In the example shown in the drawings, there are formed by demarcation by the circumferential groove 7: a shoulder land portion 9 as a land portion, located on the further outer side of the circumferential groove located at the outermost position in the tire widthwise direction in a ground contact surface of the tread portion; a center land portion 10 located at the center in the tire widthwise direction; and an intermediate land portion 11 between the center land portion 10 and the shoulder land portion 9. The resonator 1 is provided in the shoulder land portion 9 and the intermediate land portion 11. In a case where the length $L_4$ in the tire widthwise direction of the resonance cell portion 3 provided in a ground contact surface of the tread portion is too long, an edge component of the edge of the resonance cell portion in a direction extending in the tire widthwise direction is too large, whereby braking force acting on the tire circumferential direction increases and the amount of wear of the land portion increases. However, in the tire of the present invention described above, by setting the length $L_4$ in the tire widthwise direction of the resonance cell portion 3 not larger than the length $L_3$ in the tire circumferential direction thereof, the length in the tire widthwise direction of the resonance cell portion 3 and the edge component thereat are made relatively small without reducing the volume of the resonance cell portion 3, whereby generation of braking force can be suppressed and an amount of wear can be reduced.

In particular, the length $L_4$ in the tire widthwise direction of the resonance cell portion 3 provided in the shoulder land portion 9 is preferably not larger than 0.75 times as much as the length $L_3$ in the tire circumferential direction, so that the progress of the wear can be further effectively suppressed. In a case where the sectional shape of the resonance cell portion 3 changes in the depth direction, the length $L_3$ in the tire circumferential direction and the length $L_4$ in the tire widthwise direction of the opening portion to the tire surface, of the resonance cell portion 3, are regarded as the length $L_3$ in the tire circumferential direction and the length $L_4$ in the tire widthwise direction of the resonance cell portion 3, respectively.

Although the opening portion to the tire surface, of the resonance cell portion 3, of the resonator 1 exemplarily shown in FIG. 7 has a rectangular shape including a side in parallel to the tire circumferential direction and having a length $L_3$ and a side in parallel to the tire widthwise direction and having a length $L_4$, as shown in FIG. 8(a), the shape of the opening portion is not restricted to a rectangular shape and may be an ellipsoidal shape or other curved contour. Alternatively, the shape of the opening portion may have a polygonal shape such as a tetragon. When the opening portion of the resonance cell 3 has a general shape as shown in FIG. 8(b) and FIG. 9, the length $L_3$ in the tire circumferential direction and the length $L_4$ in the tire widthwise is direction of (the opening portion of) the resonance cell portion 3 are each defined as a projection length when the opening portion is projected onto a line in parallel to the tire circumferential direction C or a projection length when the opening portion is projected onto a line in parallel to the tire widthwise direction D.

The resonance frequency ($f_0$) of the resonator 1 can be changed according to necessity by selecting the shape, dimensions and the like of the resonator. In terms of suppressing pipe resonance in the frequency range generally occurring in the circumferential groove of a tire, the resonance frequency $f_0$ which the resonator should provide preferably in the range of 700 to 1800 Hz and more preferably in the range of 700 to 1400 Hz.

In the present invention, the opening area to a ground contact region, of the resonance portion 3, under a state where no load is exerted on the tire, is preferably in the range of 50 to 600 mm$^2$ and more preferably in the range of 70 to 360 mm$^2$.

In the tire of the present embodiment, the siping portion 2 and the resonance cell portion 3 of the resonator 1 are formed to open to a ground contact region. Therefore, even in a case where vulcanization molding with respect to a green tire is carried out such that mold portions protrude into portions corresponding to the siping portion and the resonance cell portion, of the green tire, the protruded mold portions can always be smoothly and reliably pulled out of the siping portion 2 and the resonance cell portion 3 of the product tire, regardless of whether the sectional areas of the siping portion 2 and the resonance cell portion 3 slightly change in the depth direction or not. As a result, the tire of the present embodiment can be manufactured in a manner similar to that in the conventional, general tire not having a resonator.

The siping portion 2 and the resonance cell portion 3 opened to a ground contact region as described above define, when the opening portions thereof are closed by a road surface, a sealed space between a ground contact surface of the tread portion and the road surface. Therefore, the resonance cell portion 3 can sufficiently demonstrate a function as a resonator.

The cross sectional area and the contour configuration of a section in parallel to a ground contact region, of the resonance cell portion 3, may be the same as those of the opening portion at the land portion or increase/decrease toward the bottom wall side of the resonance cell portion 3 to the extent that pulling-out of the mold portions from the resonance cell portion 3 of a tire which has completed the vulcanization process is not disturbed.

In the resonator 1 as described above, for example, in a case where the siping portion 2 is formed by pushing a blade of a vulcanization mold or the like into a green tire, the siping portion 2, as well as the resonance cell portion 3, can also be formed easily. In this case, the siping portion 2 can be formed by a sipe as shown in FIG. 9.

In the foregoing descriptions, the groove bottom 12 of the resonance cell portion 3 may have a flat surface or a curved surface which is convexed or concaved toward the opening side. Preferably, in terms of suppressing the groove from catching a pebble or the like therein, at least one upwardly convexed projection 13 is provided at the groove bottom, as shown in FIG. 10 which is an enlarged view of the resonance cell portion cut along the Y-Y line of FIG. 9, such that the difference 8 in height caused by the projection is at least 1.6 mm and more preferably 3.0 mm. The upper limit of the difference 8 in height is preferably smaller than the maximum depth of the resonance cell portion and more preferably smaller than (the maximum depth of the resonance cell portion-2 mm) because the projection must not disturb resonance by sectioning the resonance cell portion 3. The projection 13 in the structure above may be formed to protrude from the side wall of the resonance cell portion such that the projection is independent of or separated from the groove bottom 12.

Regarding the provision of the resonator 1 having the structure as described above with respect to the circumferential groove 7, in a case where at least one circumferential groove 7 is formed, it is preferable that a ground contact surface under the condition as described in context with FIG. 7 constantly and completely includes at least one resonator 1 provided in at least one of the circumferential grooves 7. It is more preferable that the aforementioned ground contact surface constantly and completely includes at least one resonator 1 provided in each of the circumferential grooves 7.

It is further more preferable that plural resonators 1 are provided such that plural resonators 1 having different resonance frequencies from each other constantly open to each of the circumferential groove 7 in a ground contact surface which is in contact with the road surface under the same condition as described above.

FIG. 11 is a view showing a ground contact surface, in a state similar to that described in context with FIG. 7, of a tire according to the present invention. This tire is the same as the tire of the foregoing embodiment in that a resonator 1 having the length $L_3$ in the tire circumferential direction of the resonance cell portion 3, which is longer than the length $L_4$ in the tire widthwise direction thereof, is provided in the shoulder land portion 9, but different therefrom in that other land portions, e.g. the intermediate land portion 11, is provided with a resonator 1 having a resonance cell portion 3 in which the tire widthwise direction length $L_4$ is longer than the tire circumferential direction length $L_3$.

Further, FIG. 12 is a view showing a ground contact surface, in a state similar to that described in context with FIG. 7, of a tire of another modified example of the present embodiment according to the present invention. Each of the resonators 1 of the embodiment as shown in FIG. 7 is provided such that the center line WCL in the widthwise direction of the resonance cell portion is inclined with respect to the tire widthwise direction at an inclination angle θ of 90°. In the present modified example, the inclination angle θ of the resonance cell portion 3 of the resonator 1 provided in the land portion is preferably in the range of 45° to 90°.

In the present modified example, in a case where the resonance cell portion 3 has a parallelogram shape, the inclination angle θ of the center line WCL in the widthwise direction of the resonance cell portion with respect to the tire widthwise direction D is equal to the angle formed by the two adjacent sides of the parallelogram, as shown in FIG. 13(b). However, the shape of the resonance cell portion 3 is not restricted to a parallelogram, as described above. In a case where the opening portion of the resonance cell portion has an arbitrary shape, the center line WCL in the widthwise direction of the resonance cell portion is, as shown in FIG. 13(a), an approximation line obtained from the center positions M (three points in the drawing) in the tire widthwise direction of the opening portion of the resonance cell portion.

Further, in the tire according to the present invention, the should land portion 9 is preferably provided with at least one shoulder groove 15 extending from the circumferential groove 7 toward the outer side in the tire widthwise direction to a position beyond a ground contact edge 14 of the tread portion, as shown in FIG. 14. In such a tire as described above, the shoulder groove 15 opened to the circumferential groove 7 is included in a ground contact surface when the tire is rotated with load applied thereon, whereby air column is sectioned to be shortened and the frequency of pipe resonance sounds generated from the circumferential groove 7 increases accordingly. In view of this, in the structure shown in FIG. 14, the volume of each resonance cell portion 3 is reduced so that the resonance cell portion having an increased resonance frequency is accommodated in the same ground contact surface together with the shoulder groove 15, whereby noise is reduced. It should be noted that, when a condition which decreases the volume of the resonance cell portion 3 is applied to the resonance cell portion 1, the resonance frequency which effects antiresonance increases, regardless that the resonator 1 is either the Helmholz-type resonator 1 or the stepped-type resonator 1 described above. In the structure shown in FIG. 14, since the volume of the resonance cell portion 3 of the resonator 1 is reduced, rigidity of the tread portion is enhanced and the driving stability on a dry road surface is improved. Accordingly, in this structure, by increasing the number of the provided shoulder grooves 15 included in a ground contact surface so as to increase the frequency of pipe resonance sounds, the volume of each of the resonance cell portions 3 of the resonators 1 included in the same ground contact surface can be further decreased, whereby rigidity of the tread portion is enhanced and the driving stability on a dry road surface is improved, together with reducing pipe resonance sounds. Further, by providing the shoulder groove 15, an edge component is increased, thereby improving an effect of cutting a water film on a wet road surface, and also the groove volume of the tread portion is increased, thereby improving an effect of sucking water on a road surface into the groove, whereby the running performance on a wet road surface is comprehensively improved.

Yet further, when viewed in the tire circumferential direction, it is preferable that the shoulder groove 15 is formed between two adjacent resonance cell portions 1, i.e. such that the resonance cell portion 1 and the shoulder groove 15 are brought into contact with the ground alternately when the tire is rotated with load applied thereon. In a case where only the resonators 1 or only the shoulder grooves 15 are continuously brought into contact with the ground, the frequency of pipe resonance sounds generated from the circumferential groove 7 cannot be increased in a stable manner and the magnitude of decrease in the pipe resonance sounds by the resonance frequency of the resonator 1 is not even, whereby noise may not be sufficiently reduced.

Yet further, the provision pitch of the shoulder groove 15 is preferably set such that the shoulder groove 15 is included within a ground contact surface of the circumferential groove 7. In a case where the provision pitch of the shoulder groove 15 is longer than the ground contact length of the circumferential groove 7 when a tire is rotated with load exerted thereon, there is a possibility that the shoulder groove 15 is not in contact with a road surface, although the resonator 1 is in contact with said road surface, whereby no column is formed between the shoulder groove 15 and the road surface where the tire is rotated with load applied thereon. In this case, as a result, the frequency of pipe resonance sounds generated from the circumferential groove 7 is not increased and thus the pipe resonance sounds may not be sufficiently decreased by the resonator 1 having the resonance cell portion 3 of which volume has been reduced.

Yet further, the provision pitch of the resonator 1 is preferably shorter than the ground contact length of the circumferential groove 7. In a case where the provision pitch of the resonator 1 is longer than the ground contact length of the circumferential groove 7 when a tire is rotated with load exerted thereon, there is a possibility that the resonator 1 is not in contact with a road surface, although the shoulder groove 15 is in contact with said road surface and is sufficiently increasing the frequency of pipe resonance generated from the circumferential groove 7, whereby pipe resonance sounds cannot be sufficiently decreased. In the present invention, a "ground contact length of the circumferential groove" represents a length in the tire circumferential direction of the circumferential groove, in a region of a ground contact surface of the tread portion in contact with a road surface when a tire inflated at the standard air pressure prescribed in JATMA is rotated with 80% of the maximum load exerted thereon.

Yet further, the resonator 1 is preferably provided in the land portion 16 on the inner side in the tire widthwise direction of the circumferential groove 7. In a case where the resonator 1 is not provided in the land portion 16 on the inner side in the tire widthwise direction but provided on the shoulder land portion 9, both the resonator 1 and the shoulder groove are provided in the shoulder land portion 9, whereby rigidity of the shoulder land portion 9 is decreases, possibly causing break of the tread portion due to partial wear and/or coming-off of the shoulder land portion 9.

Yet further, the shoulder groove 15 preferably opens at a ground contact region when a tire is rotated with load exerted thereon. In a case where the shoulder groove 15 fails to open at a ground contact region when a tire is rotated with load exerted thereon, i.e. where the shoulder groove 15 is then completely closed, the frequency of pipe resonance sounds generated from the circumferential groove 7 can no longer be increased by the shoulder groove 15, whereby pipe resonance sounds may not be effectively decreased by the resonator 1 having the resonance cell portion 3 of which volume has been reduced.

Yet further, it is preferable that each of the tread half regions is provided with the circumferential groove 7, the resonator 1 and the shoulder groove 15. In a case where the circumferential groove 7 is provided at each tread half region, driving stability can be further improved, while pipe resonance sounds are further decreased, by providing the resonator 1 and the shoulder groove 15 in each of the tread half regions rather than providing the resonator and the shoulder groove 15 in only one of the tread half regions.

Yet further, the dimensions and shapes of the plural resonators 1 provided in a ground contact surface of the tread portion can be varied, such that the resonance frequencies thereof are differentiated from each other and the band of frequency which effects antiresonance can be set in a relatively wide range.

Yet further, in the tire of the present invention, as shown in FIG. 16, the siping portion 2 preferably has an enlarged portion 17 on the groove bottom side thereof such that the enlarged portion 17 has a groove width larger than the opening width of the siping portion 2. In such a pneumatic tire as described above, since the siping portion 2 has on the groove bottom side thereof the enlarged portion 17 having a groove width larger than the opening width of the siping portion 2, if the rubber of the tread portion deforms when a tire is rotated with load exerted thereon and an opening portion at a ground contact surface of the siping portion 2 is closed due the walls thereof are brought into contact with each other, change in volume of the enlarged portion 17 is relatively small and the volume of the siping portion 2 can be ensured sufficiently, whereby a desired resonance frequency can be ensured and pipe resonance sounds can be effectively decreased, while drainage performance can be improved together. Further, since the enlarged portion 17 is provided on the groove bottom side of the siping portion 2, the volume of the siping portion 2 can be ensured even after the middle stage of wear, at which wear has been significantly developed, whereby drainage performance can be effectively enhanced throughout a period from the brand new stage to the end stage of wear of the tire. It should be noted that, at the middle to end stage of wear, pipe resonance sounds generated from the circumferential groove are decreased to a negligible degree, whereby it is no longer necessary to consider the effect of decreasing pipe resonance sounds. The enlarged portion 17 of the siping 2 may have an ellipsoidal or polygonal shape or the like.

Yet further, in the tire as shown in FIG. 16, the enlarged portion of the siping groove 2 has a structural characteristic that, in a section of the siping groove 2 orthogonal to the extending direction thereof, the groove width gradually increases from the opening portion to the groove width maximum portion. Accordingly, when the tire is removed from a mold after vulcanization molding, the rubber portion of the siping portion is less likely to be caught by the mold and thus the siping portion 2 is less likely to be destroyed when the tire is pulled out of the mold.

Yet further, as shown in FIG. 17, the siping portion 2 preferably includes, in a section orthogonal to the extending direction thereof, a constant groove width portion 18 where the groove width is constant from an opening portion at a ground contact surface of the siping portion 2 toward the groove bottom side; and an enlarged portion 17 having a relatively large groove width provided on the further groove bottom side than the constant groove width portion 18. In a case where such a structure as described above is employed, if an opening portion at a ground contact surface of the siping 2 is closed due to the walls thereof are brought into contact with each other when a tire is rotated with load exerted thereon, the constant groove width portion 18 is first closed due to the walls contacting each other. Accordingly, change in rigidity of the land portion is relatively small, there is not so much change in volume of the enlarged portion 17 and the volume of the siping portion 2 can be sufficiently ensured, whereby drainage property may be improved, while pipe resonance sounds are effectively decreased. In the present invention, the "constant groove width portion" represents a portion where the groove width is constant, ranging from an opening portion at a ground contact surface of the siping portion 2 to the enlarged portion of the siping 2.

In the structure as shown in FIG. 17, the enlarged portion 17 of the siping portion 2 preferably has, in a section of the siping portion 2 orthogonal to the extending direction thereof, a configuration in which the groove width gradually increases from the end portion on the tire radially direction inner side of the constant groove width portion 18 to the groove bottom, as shown in FIG. 18. In a case where such a structure as described above is employed, if an opening portion at a ground contact surface of the siping portion 2 is closed due to the walls thereof contacting each other when a tire is rotated with load exerted thereon, the constant groove width portion 18 is at first closed due to the walls thereof contacting each other, there is not so much change in volume of the enlarged portion 17 and thus the volume of the siping portion 2 can be sufficiently ensured, whereby drainage property may be improved, while pipe resonance sounds are effectively decreased. Further, in the case of the structure shown in FIG. 18, due to the structural characteristic thereof that the groove width of the enlarged portion 17 gradually increases toward the maximum groove width portion thereof, when a tire is removed from a mold after vulcanization molding, a blade for forming the siping portion 2 may be smoothly pulled out of the rubber portion of the tire, whereby the siping portion 2 is less likely to be destroyed when the tire is pulled out of the mold.

Figure 19:
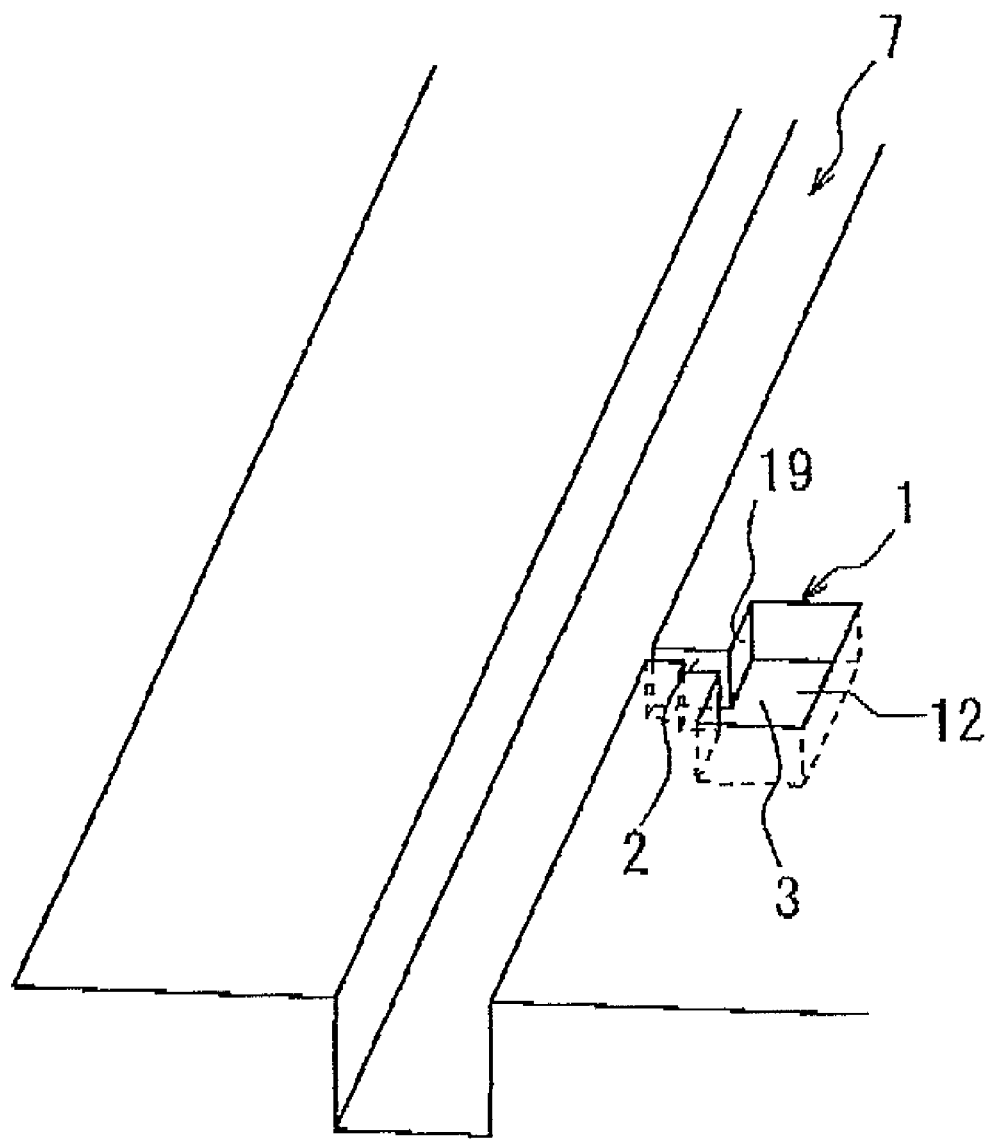
FIG. 19 is a perspective view of a part of a tread portion of yet another tire according to the present invention.

Yet further, in the tire of the present invention, as shown in FIG. 19, it is preferable that a section of the resonance cell portion 3 orthogonal to the extending direction thereof is larger than a section of the siping portion 2 orthogonal to the extending direction thereof and that the depth of the resonance cell portion 3 is not larger than the width of the resonance cell portion 3 at a ground contact surface of the tread portion. In the tire as described above, while pipe resonance sounds are decreased by provision of the resonator 1, since the depth of the resonance cell portion 3 is not larger than the width of the resonance cell portion 3 at a ground contact surface of the tread portion, a pebble or a gravel entering the resonance cell portion 3 when the tire is rotated with load exerted thereon is less likely to be caught therein and rather ejected from the resonance cell portion 3. If the resonance cell portion 3 has caught a pebble or a gravel therein, since the pebble or gravel is likely to protrude from the ground contact surface of the tread portion, when the tire is rotated with load exerted thereon, the pebble or gravel protruding from the ground contact surface of the tread portion is brought into contact with the ground and hooked by the ground, whereby the pebble or gravel is drag0ged out of the resonance cell portion 3 and the thus pebble-biting-preventing property of the resonator 1 is effectively improved.

Figure 20:
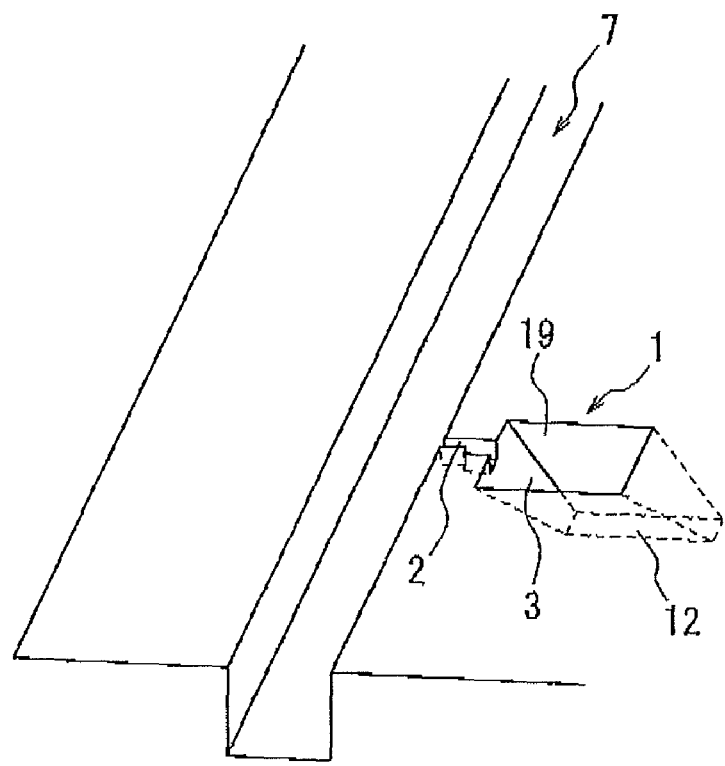
FIG. 20 is a perspective view of a part of a tread portion of yet another tire according to the present invention.
Figure 21:
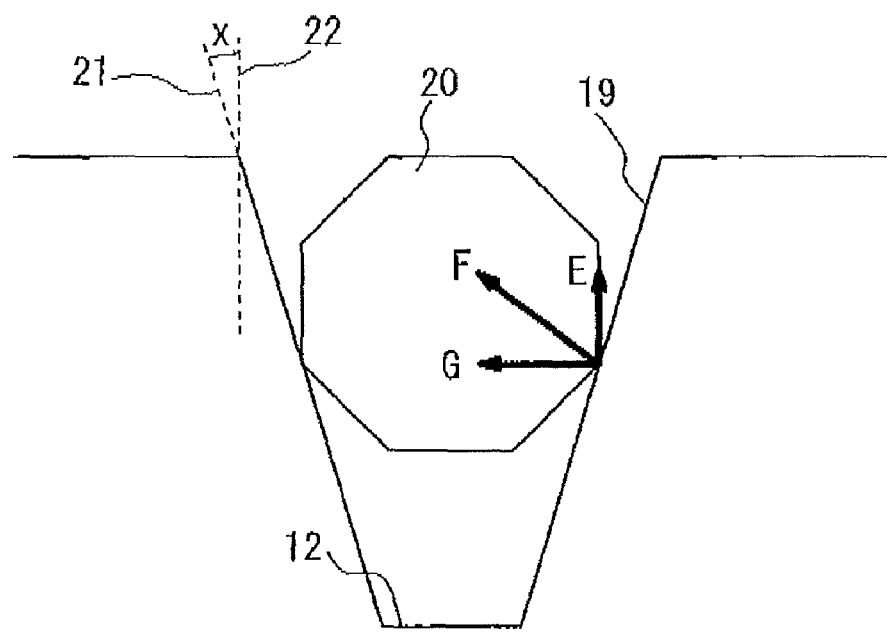
FIG. 21 is a sectional view in the tire widthwise direction of the resonance cell portion and the vicinities thereof shown in FIG. 20.

Yet further, in the tire of the present invention, as shown in FIG. 20, it is preferable that a section of the resonance cell portion 3 orthogonal to the extending direction thereof is larger than a section of the siping portion 2 orthogonal to the extending direction thereof and that the width of the resonance cell portion 3 gradually decreases from a ground contact surface of the tread portion to the bottom 12 of the resonance cell portion 3. In the tire as described above, since the width of the resonance cell portion 3 gradually decreases from a ground contact surface of the tread portion to the bottom 12 of the resonance cell portion 3, if a pebble or a gravel is caught by the resonance cell portion 3, the resonance cell portion 3 collapse-deforms in the longitudinal direction thereof due to friction between the ground contact surface of the tread portion and a road surface when the tire is rotated with load exerted thereon, whereby, as shown in FIG. 21, compression force F is exerted on the pebble or gravel 20 from a wall portion 19 of the resonance cell portion 3 and, due to the compression force F being constituted of components of force E, G, the component of force E in the direction of pushing the pebble or gravel 20 out of the resonance cell portion 3 presses the pebble or gravel 20 from the inner side toward the outer side in the tire radial direction, thereby pushing the pebble or gravel out of the resonance cell portion 3. Accordingly, it is possible to effectively improve the pebble-biting-preventing property of the resonator 1.

Figure 22:
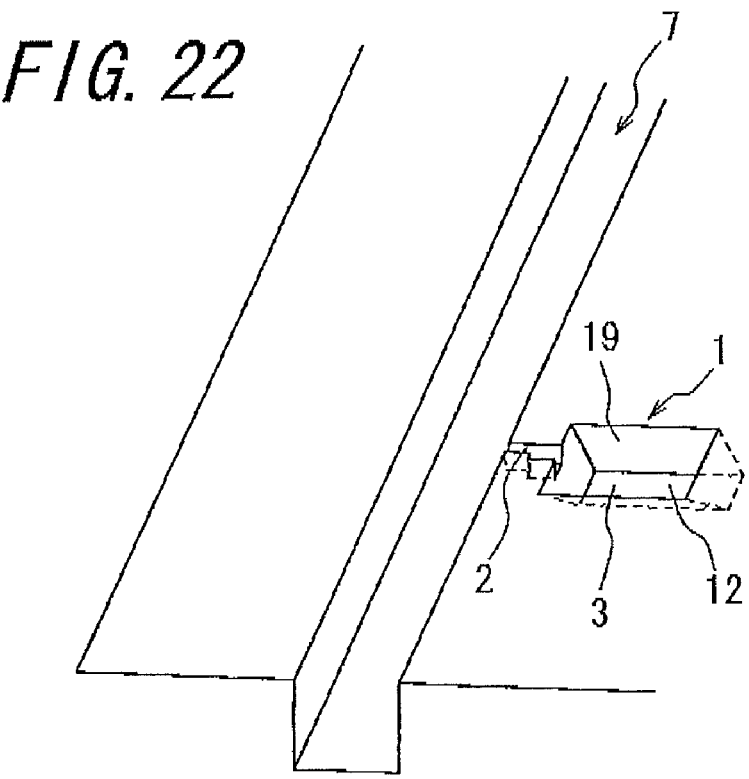
FIG. 22 is a perspective view of a part of a tread portion of yet another tire according to the present invention.

Alternatively, in the tire of the present invention, as shown in FIG. 22, it is preferable that a section of the resonance cell portion 3 orthogonal to the extending direction thereof is larger than a section of the siping portion 2 orthogonal to the extending direction thereof, that the depth of the resonance cell portion 3 is not larger than the width of the resonance cell portion 3 at a ground contact surface of the tread portion and that the width of the resonance cell portion 3 gradually decreases from a ground contact surface of the tread portion to the bottom 12 of the resonance cell portion 3. Such a tire as described above can cause the effects described in context with FIG. 19 and FIG. 20 simultaneously and is capable of further improving the pebble-biting-preventing property of the resonance cell portion 1. In view of a fact that the groove volume of the circumferential groove 7 decreases as wear of a tire progresses and pipe resonance sounds are less likely to be generated, the respective tires of the present invention described above primarily demonstrate the effects thereof at the initial stage of wear of the tread portion.

Yet further, in the tires of the present invention described with reference to FIGS. 20 to 22, it is preferable that the length of the resonance cell portion 3 gradually decreases from a ground contact surface of the tread portion to the bottom portion 12 of the resonance cell portion 3. In a case where the length of the resonance cell portion 3 gradually decreases from a ground contact surface of the tread portion to the bottom portion 12 of the resonance cell portion 3, as in the case where the width of the resonance cell portion 3 gradually decreases from a ground contact surface of the tread portion to the bottom portion 12 of the resonance cell portion 3, the wall portion 19 of the resonance cell portion 3 collapse-deforms in the longitudinal direction of the resonance cell portion 3 in a state where a pebble or a gravel is caught therein when the tire is rotated with load exerted thereon, whereby the pebble or gravel is pressed from the inner side toward the outer side in the tire radial direction due to the compression pressure from the wall portion 19 and pushed out of the resonance cell portion 3. That is, the pebble-biting-preventing property of the resonance cell portion 1 may be improved.

Figure 23:
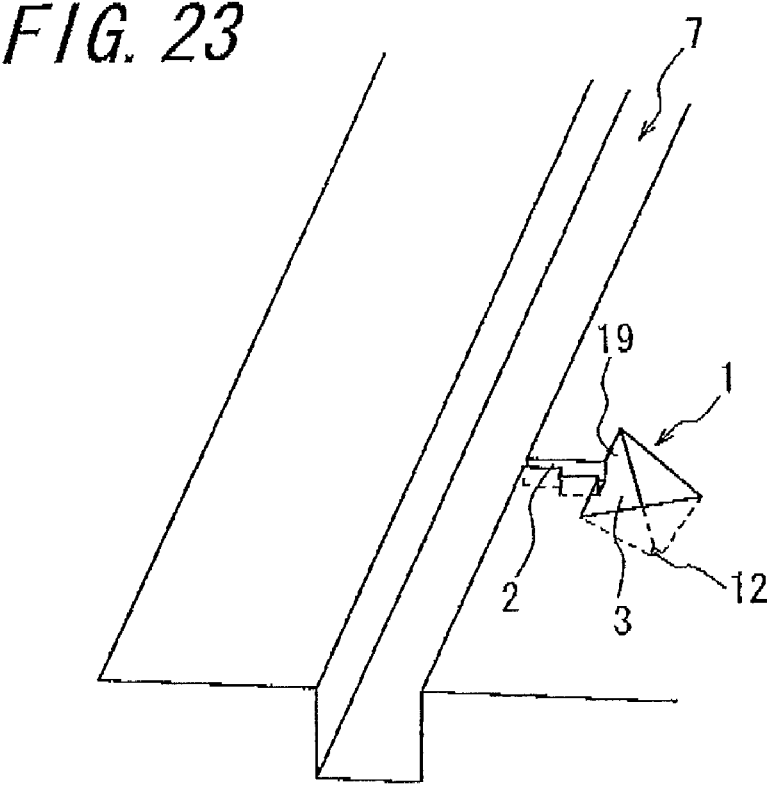
FIG. 23 is a perspective view of a part of a tread portion of yet another tire according to the present invention.
Figure 24:
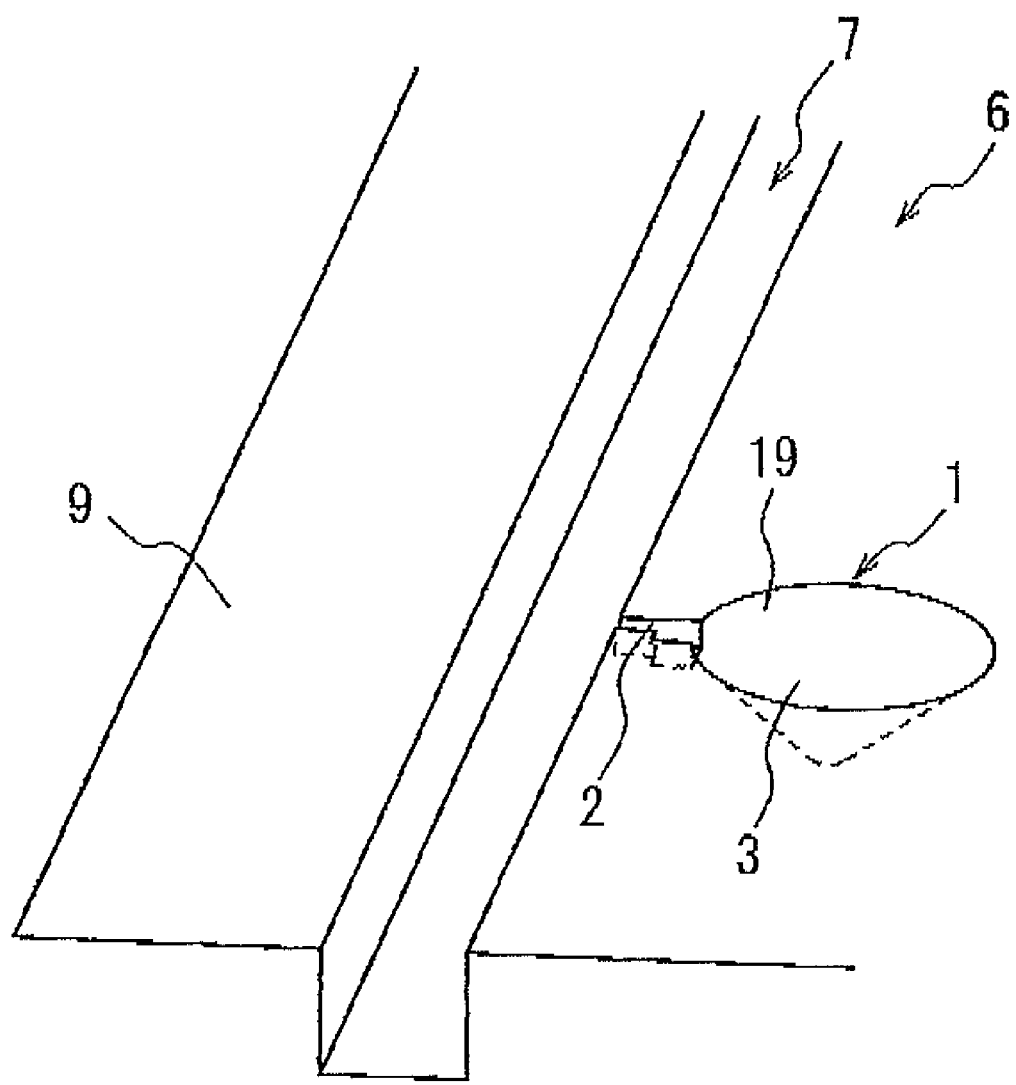
FIG. 24 is a perspective view of a part of a tread portion of yet another tire according to the present invention.

Yet further, as shown in FIG. 23 and FIG. 24, in the tire of the present invention described with reference to FIG. 20 and FIG. 22, the resonance cell portion 3 is preferably designed to have a tetrahedron-shape in which a section thereof orthogonal to the tire radial direction gradually decreases from a ground contact surface of the tread portion to the bottom portion 12 of the resonance cell portion 3. In a case where the resonance cell portion 3 has a tetrahedron-like shape, a pebble or a gravel is less likely to caught by the resonance cell portion 3 and, if the resonance cell portion has caught a pebble or a gravel bit therein, relatively large compression stress is exerted from the wall portion 19 of the resonance cell portion 3, regardless that in whichever direction the wall portion 19 collapse-deforms when the tire is rotated with load applied thereon, whereby the pebble or gravel is pressed from the inner side to the outer side in the tire radial direction and pushed out of the resonance cell portion 3. That is, the pebble-biting-preventing property of the resonance cell portion 1 may be improved.

Yet further, as shown in FIG. 21, in the tire of the present invention described with reference to FIG. 20 and FIG. 22, the angle X formed between the extending direction 21 of at least one of the wall portion 19 extending from a ground contact surface of the tread portion to the bottom 12 of the resonance cell portion 3 and a normal 22 with respect to the ground contact surface of the tread portion is preferably in the range of 30° to 60° and more preferably in the range of 30° to 45°. In a case where the angle X formed between the extending direction 21 of the wall portion 19 and a normal 22 with respect to the ground contact surface of the tread portion is smaller than 30°, the angle X is so small that the compression stress to push a pebble or gravel from the inner side toward the outer side in the tire radial direction when tire is rotated with load exerted thereon is weakened accordingly, whereby the pebble or gravel may not be ejected smoothly. In a case where the angle X formed between the extending direction 21 of the wall portion 19 and a normal 22 with respect to the ground contact surface of the tread portion exceeds 60°, the angle X is so large that the shape of the resonance cell portion 3 is rather similar to that in which the wall portion 19 is in parallel to a road surface, whereby, although a pebble or gravel is less likely to be caught therein, the volume of the resonance cell portion 3 cannot be sufficiently ensured. In this case, if a sufficient volume were to be somehow ensured, the resonance cell portion 3 would disappear due to wear at the early stage of wear of the tire and the function as the resonator 1 might be marred. It is preferable that all of the angles formed between the normal 22 and the extending directions 21 of all of the walls 19 are within the aforementioned range rather than the angle formed between the normal 22 and the extending direction 21 of one of the walls 19 is within the aforementioned range. In a case where all of the angles formed between the normal 22 and the extending directions 21 of all of the walls 19 are within the aforementioned range, a pebble or gravel is less likely to be caught therein and compression stress pressing the pebble or gravel from the inner side toward the outer side in the tire radial direction is increased, whereby the pebble or gravel is pushed out of the resonance cell portion 3 and the pebble-biting-preventing property of the resonance cell portion 1 may be improved.

Figure 25:
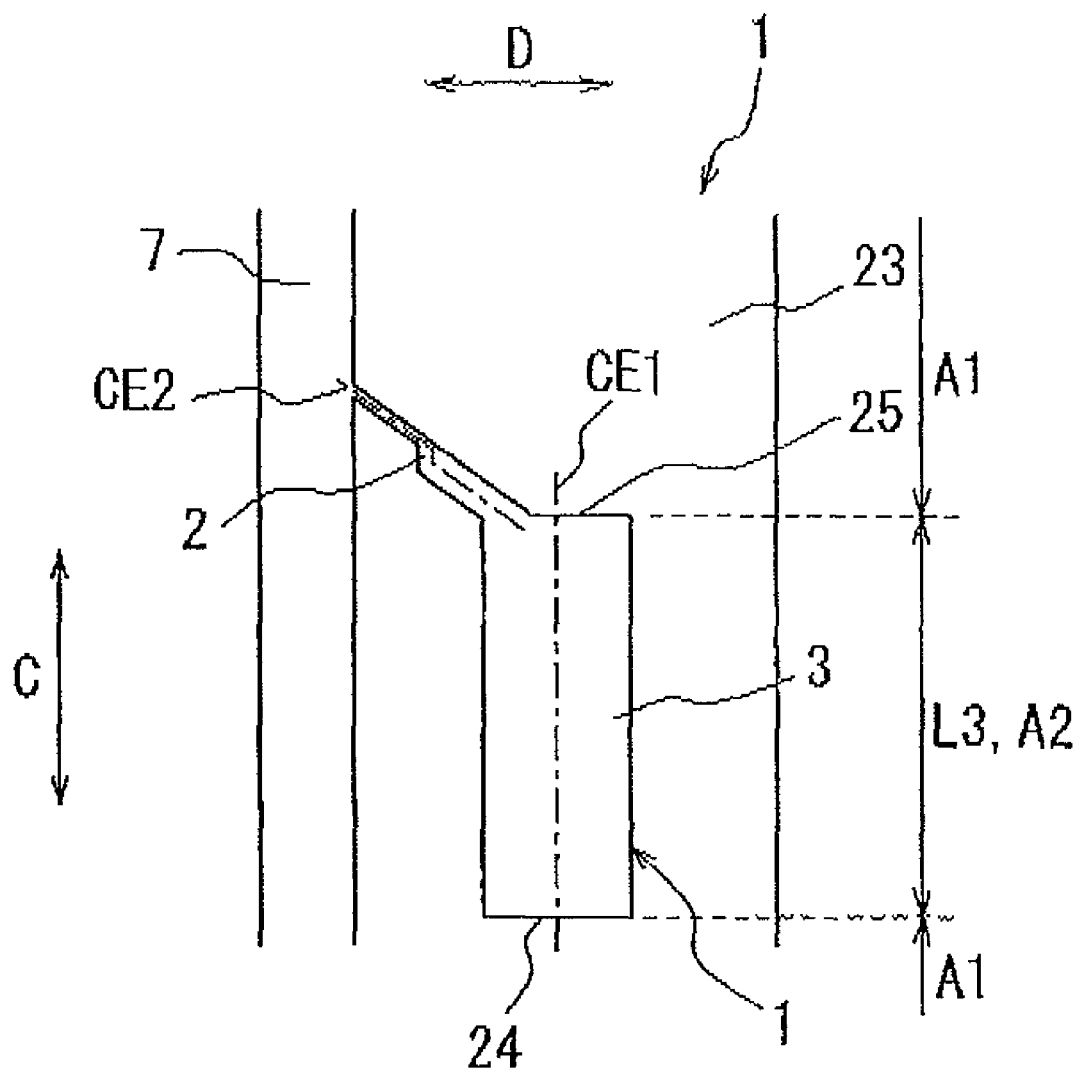
FIG. 25 is an enlarged plan view showing, in an enlarged manner, a main part of a tread portion of yet another tire according to the present invention.

Yet further, in the tire of the present invention, as shown in FIG. 25, it is preferable that the tread portion thereof is provided with a circumferential groove 7 and a rib-like land portion 23 adjacent to the circumferential groove, a resonator 1 is provided in the rib-like land portion 23 such that a sectional area of a section of a resonance cell portion 3 of the resonator, which section is orthogonal to the center line CE1 of the resonance cell portion 3, is larger than a sectional area of a section of the siping portion 2 of the resonator, which section is orthogonal to the center line CE2 of the siping portion 2, the resonator 1 has a first end 24 and a second end 25 defining the length $L_3$ in the tire circumferential direction of the resonance cell portion 3, and the siping portion 2 extends from the second end 25 in a direction away from the first end 24 (upward in FIG. 25).

According to the tire of the embodiment as shown in FIG. 25, the siping portion 2, which decreases rigidity of the rib-like land portion 23, is disposed in a section where rigidity is relatively large in the rib-like land portion 23, i.e. in the shown example, section A1 where the resonance cell portion 3 is not provided in the rib-like land portion 23 when viewed in the tire widthwise direction, whereby change in the tire-widthwise-direction-sectional area of the rib-like land portion 23 along the tire circumference is small, as compared with a case where the siping portion 2 is disposed in a section where rigidity is relatively small in the rib-like land portion 23, i.e. section A2 where the resonance cell portion 3 is provided in the rib-like land portion 23 when viewed in the tire widthwise direction, and rigidity of the rib-like land portion 23 along the tire circumference is thus made even. Since pattern noise occurs due to variation in rigidity of the rib-like land portion 23 along the tire circumference, such pattern noise can be decreased by making rigidity distribution of the rib-like land portion 23 along the tire circumference even. Further, as shown in FIG. 25, in a case where the longitudinal direction of the resonance cell portion 3 coincides with the tire circumferential direction, change in the tire widthwise direction sectional area along the tire circumference can be made evener and thus pattern noise can be further decreased. In the present invention, the case where "the longitudinal direction of the resonance cell portion 3 coincides with the tire circumferential direction" includes not only a case where the longitudinal direction of the resonance cell portion 3 extends in parallel with the tire circumferential direction but also a case where the longitudinal direction of the resonance cell portion is inclined at an angle of 45° or less, measured from the acute angle side, with respect to the tire circumferential direction.

Figure 26:
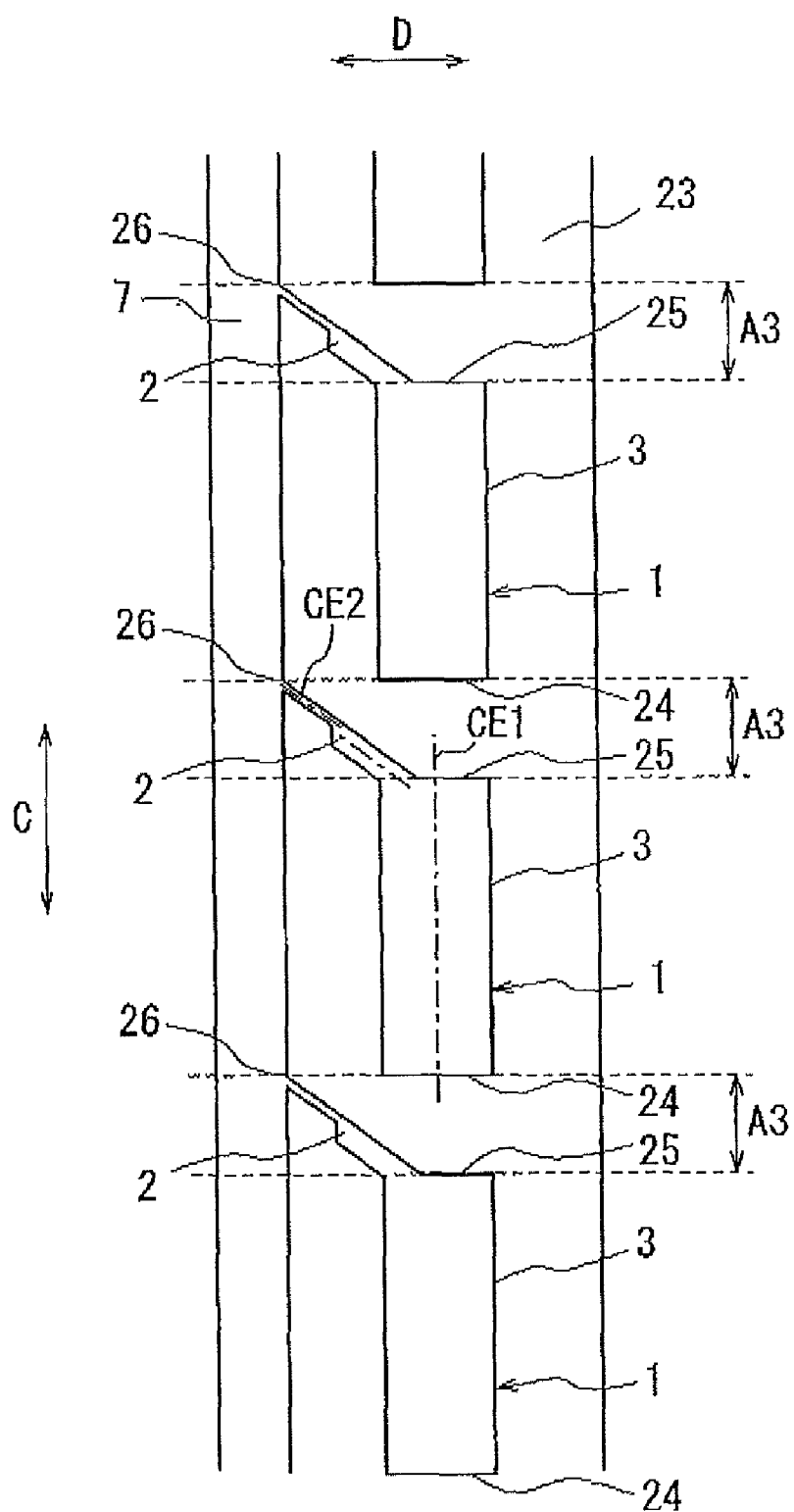
FIG. 26 is an enlarged plan view showing, in an enlarged manner, a main part of a tread portion of yet another tire according to the present invention.

Next, another embodiment according to the present invention will be described. FIG. 26 is an enlarged plan view showing in an enlarged manner a main portion of a tread portion of a tire of the another embodiment. The arrow C shown in the drawing represents the tire circumferential direction and the arrow D represents the tire widthwise direction. The same reference numerals are assigned to the same members as those of the tire of the embodiment shown in FIG. 25.

The tire shown in FIG. 26 has a circumferential groove 7 extending in the tire circumferential direction and a rib-like land portion 23 adjacent thereto in a tread portion. Further, the tire has, in the rib-like land portion 23, plural resonators 1 provided in the tire circumferential direction and constituted of a siping portion opened to the circumferential direction 7 and a resonance cell portion 3 communicating with the circumferential groove 7 via the siping portion 2, so that the resonators 1 decrease noise generated by resonance inside columns formed by the circumferential groove and a road surface. The resonance cell portion 3 is formed such that a sectional area of section thereof orthogonal to the center line CE1 is larger than a sectional area of a section of the siping portion 2 orthogonal to the center line CE2.

The main characteristics in structural terms of the tire of the present embodiment reside, as shown in FIG. 26, in that the resonator 1 has a first end 24 and a second end 25 defining the length in the tire circumferential direction of the resonance cell portion 3, the siping portion 2 extends from the second end 25 in a direction away from the first end 24, and the first end 24 of the resonator 1 is aligned, on the same line in the tire widthwise direction, with an opening end 26 opening to the circumferential groove 7, of the siping portion 2 of another resonator 1 adjacent to the resonator 1 in the tire circumferential direction.

According to the tire of the embodiment as shown in FIG. 26, the siping portion 2 which decreases rigidity of the rib-like land portion 23 is disposed in a section having relatively large rigidity in the rib-like land portion, i.e. in the case of the shown example, section A3 between the resonance cell portion 3 of one resonator 1 and the resonance cell portion 3 of another resonator 1 in the rib-like land portion 23; and the first end 24 of the one resonator 1 is aligned, on the same line in the tire widthwise direction, with the opening end 26 opening to the circumferential groove 7, of the siping 2 of another resonator 1 adjacent to the one resonator 1 in the tire circumferential direction, whereby sections of the rib-like land portion 23, in which sections the siping 2 or the resonance cell portion 3 does not exist when viewed in the tire widthwise direction, are eliminated. Accordingly, change in the tire widthwise direction sectional area of the rib-like land portion 23 along the tire circumference is further decreased and rigidity of the rib-like land portion 23 along the tire circumference is further made even. As a result, pattern noise due to changes in rigidity of the rib-like land portion 23 along the tire circumference is further decreased.

Figure 27:
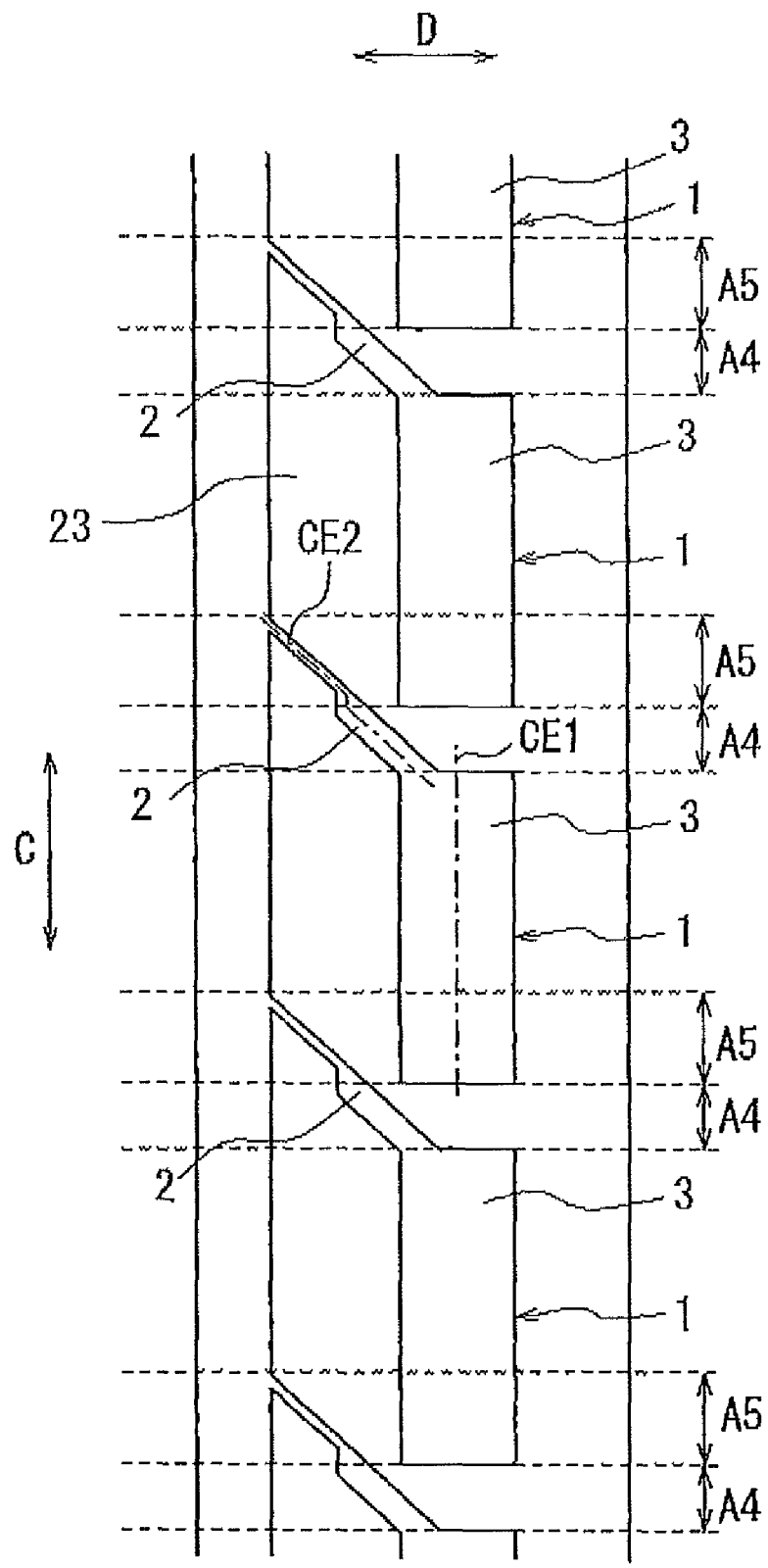
FIG. 27 is an enlarged plan view showing, in an enlarged manner, a main part of a tread portion of yet another tire according to the present invention.

Next, yet another embodiment according to the present invention will be described. FIG. 27 is an enlarged plan view showing in an enlarged manner a main portion of a tread portion of a tire of the yet another embodiment. The arrow C shown in the drawing represents the tire circumferential direction and the arrow D represents the tire widthwise direction. The same reference numerals are assigned to the same members as those of the tire of the foregoing embodiments.

The tire shown in FIG. 27 has a circumferential groove 7 extending in the tire circumferential direction and a rib-like land portion 23 adjacent thereto in a tread portion. Further, the tire has in the rib-like land portion 23 plural resonators 1 provided in to the tire circumferential direction and constituted of a siping portion opened to the circumferential direction 7 and a resonance cell portion 3 communicating with the circumferential groove 7 via the siping portion 2, so that the resonators 1 decrease noise generated by resonance inside columns formed by the circumferential groove 7 and a road surface. The resonance cell portion 3 is formed such that a sectional area of section thereof orthogonal to the center line CE1 is larger than a sectional area of a section of the siping portion 2 orthogonal to the center line CE2.

The main characteristic in structural terms of the tire of the present embodiment resides, as shown in FIG. 27, in that, when viewed in the tire widthwise direction, the resonance cell portion 3 of one resonator 1 partially overlaps the siping portion 2 of another resonator 1 adjacent to the one resonator 1 in the tire circumferential direction, i.e. when the resonance cell portion 3 and the siping portion 2 are projected onto the tire equatorial plane, the extension ranges in the tire circumferential direction of the respective projection shapes (not shown) partially overlap with each other.

According to the tire of the embodiment as shown in FIG. 27, the siping portion 2 which decreases rigidity of the rib-like land portion 23 is disposed in a section having relatively large rigidity in the rib-like land portion 23, i.e. in the case of the shown example, section A4 between the resonance cell portion 3 of one resonator 1 and the resonance cell portion 3 of another resonator 1 in the rib-like land portion 23; and, when viewed in the tire widthwise direction, the resonance cell portion 3 of the resonator 1 is disposed to partially overlap with the siping portion 2 of another resonator 1 adjacent to the resonator 1 in the tire circumferential direction (section A5) so that the length in the tire circumferential direction of section A4, where only the siping portion 2 of the resonator 1 exists in the rib-like land portion 23 when viewed in the tire widthwise direction and therefore has relatively high rigidity, is shortened, whereby change in the tire widthwise direction sectional area of the rib-like land portion 23 along the tire circumference causes less effect on rigidity of the rib-like land portion 23 along the tire circumference than the structure of FIG. 26. As a result, pattern noise due to changes in rigidity of the rib-like land portion 23 along the tire circumference is further decreased.

Figure 28:
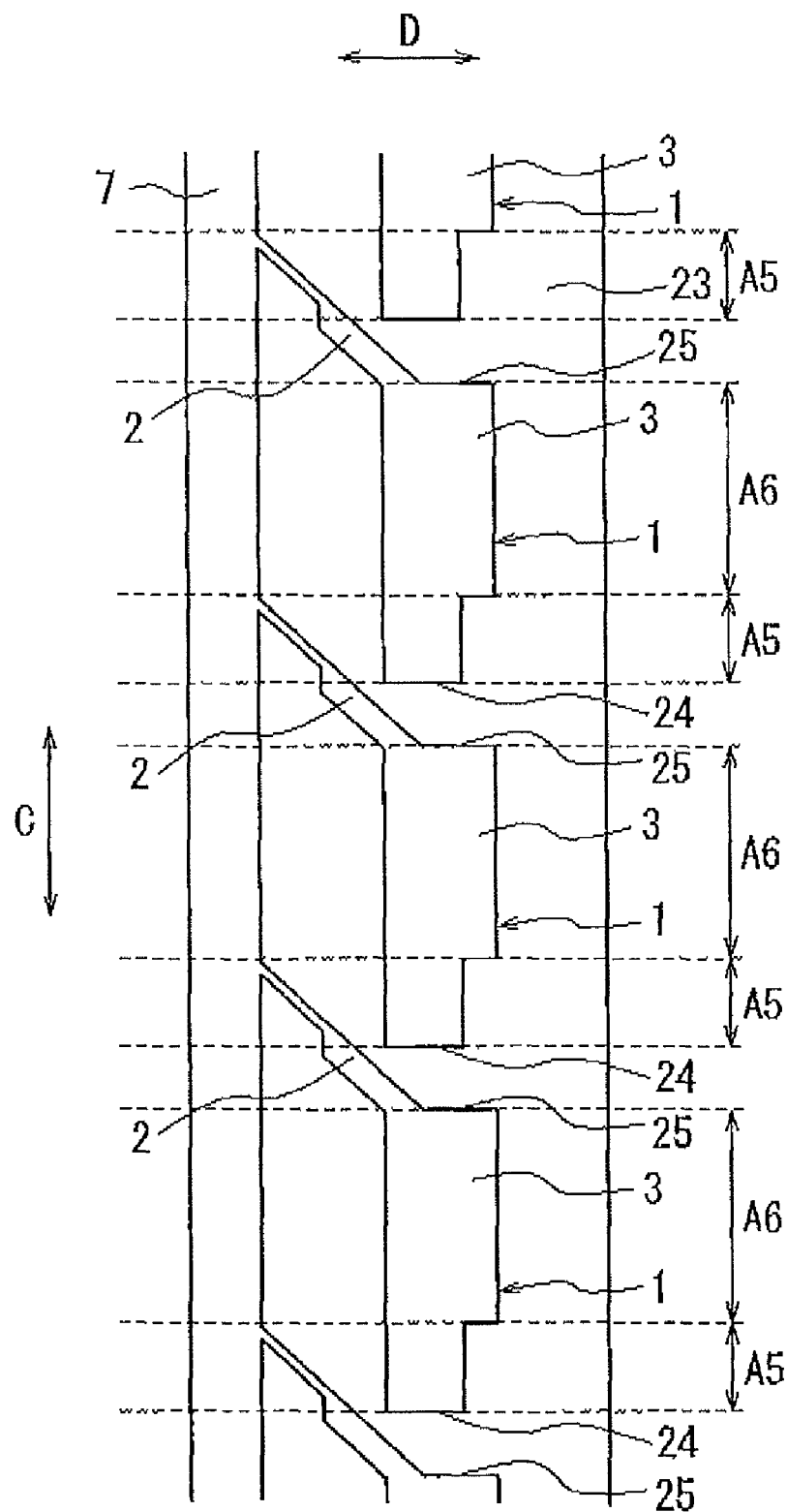
FIG. 28 is an enlarged plan view showing, in an enlarged manner, a main part of a tread portion of yet another tire according to the present invention.

Further, in the tire of the present embodiment, as shown in FIG. 28, provided that, when viewed in the tire widthwise direction, a section where the resonance cell portion 3 of one resonator 1 overlaps the siping portion 2 of another resonator 1 adjacent to the one resonator 1 in the tire circumferential direction is A5 and a section where only the resonance cell portion 3 exists is A6, in the same resonance cell portion 3, a tire widthwise direction sectional area of the resonance cell portion 3 in section A5 is preferably at least partially smaller than a tire widthwise direction section area of the resonance cell portion in section A6. In such a structure as shown in FIG. 28, change in the tire widthwise direction sectional area of the rib-like land portion 23 along the tire circumference is further decreased and rigidity of the rib-like land portion 23 along the tire circumference is further made even. As a result, pattern noise due to changes in rigidity of the rib-like land portion 23 along the tire circumference is further decreased.

Figure 29:
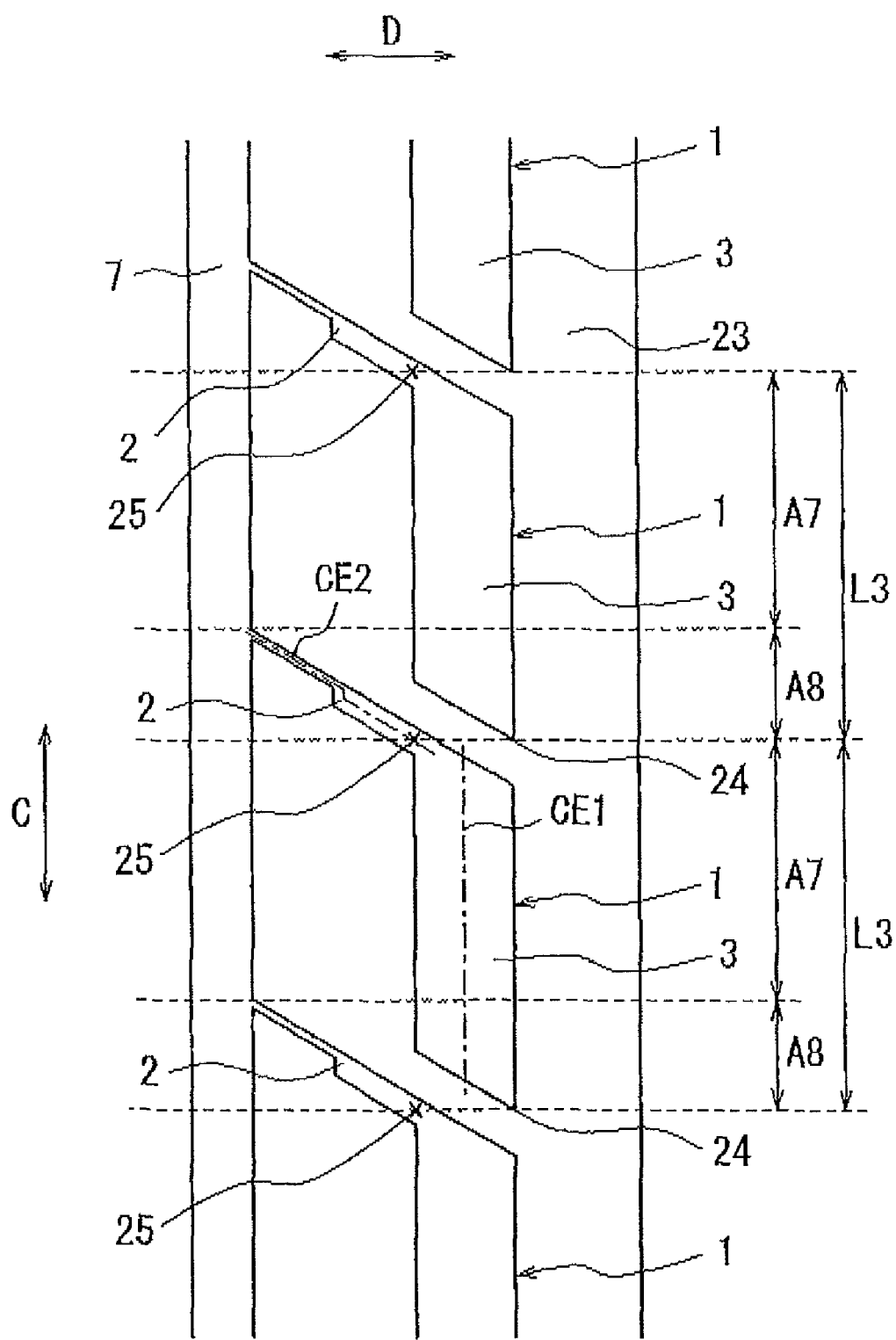
FIG. 29 is an enlarged plan view showing, in an enlarged manner, a main part of a tread portion of yet another tire according to the present invention.

Next, yet another embodiment according to the present invention will be described. FIG. 29 is an enlarged plan view showing in an enlarged manner a main portion of a tread portion of a tire of the yet another embodiment. The arrow C shown in the drawing represents the tire circumferential direction and the arrow D represents the tire widthwise direction. The same reference numerals are assigned to the same members as those of the tire of the foregoing embodiments.

The tire shown in FIG. 29 has a circumferential groove 7 extending in the tire circumferential direction and a rib-like land portion 23 adjacent thereto in a tread portion. Further, the tire has in the rib-like land portion 23 plural resonators 1 provided in the tire circumferential direction and constituted of a siping portion opened to the circumferential direction 7 and a resonance cell portion 3 communicating with the circumferential groove 7 via the siping portion 2, so that the resonators 1 decrease noise generated by resonance inside columns formed by the circumferential groove 7 and a road surface. The resonance cell portion 3 is formed such that a sectional area of section thereof orthogonal to the center line CE1 is larger than a sectional area of a section of the siping portion 2 orthogonal to the center line CE2.

The main characteristic in structural terms of the tire of the present embodiment resides, as shown in FIG. 29, in that the resonator 1 has a first end 24 and a second end 25 defining the length L in the tire circumferential direction of the resonance cell portion 3 and the first end 24 of the resonator 1 is aligned, on the same line in the tire widthwise direction, with the second end 25 of another resonator 1 adjacent to the resonator 1 in the tire circumferential direction.

According to the tire of the embodiment as shown in FIG. 29, the rib-like land portion 23 is constituted, when viewed in the tire widthwise direction, of section A7 where only the resonance cell portion 3 exists and section A8 including the resonance cell portion 3 and the siping portion 2 so that a section including only the siping portion 2 and having relatively large rigidity is eliminated, whereby change in the tire widthwise direction sectional area of the rib-like land portion 23 along the tire circumference is further decreased and rigidity of the rib-like land portion 23 along the tire circumference is further made even. As a result, pattern noise due to changes in rigidity of the rib-like land portion 23 along the tire circumference is further decreased.

Figure 30:
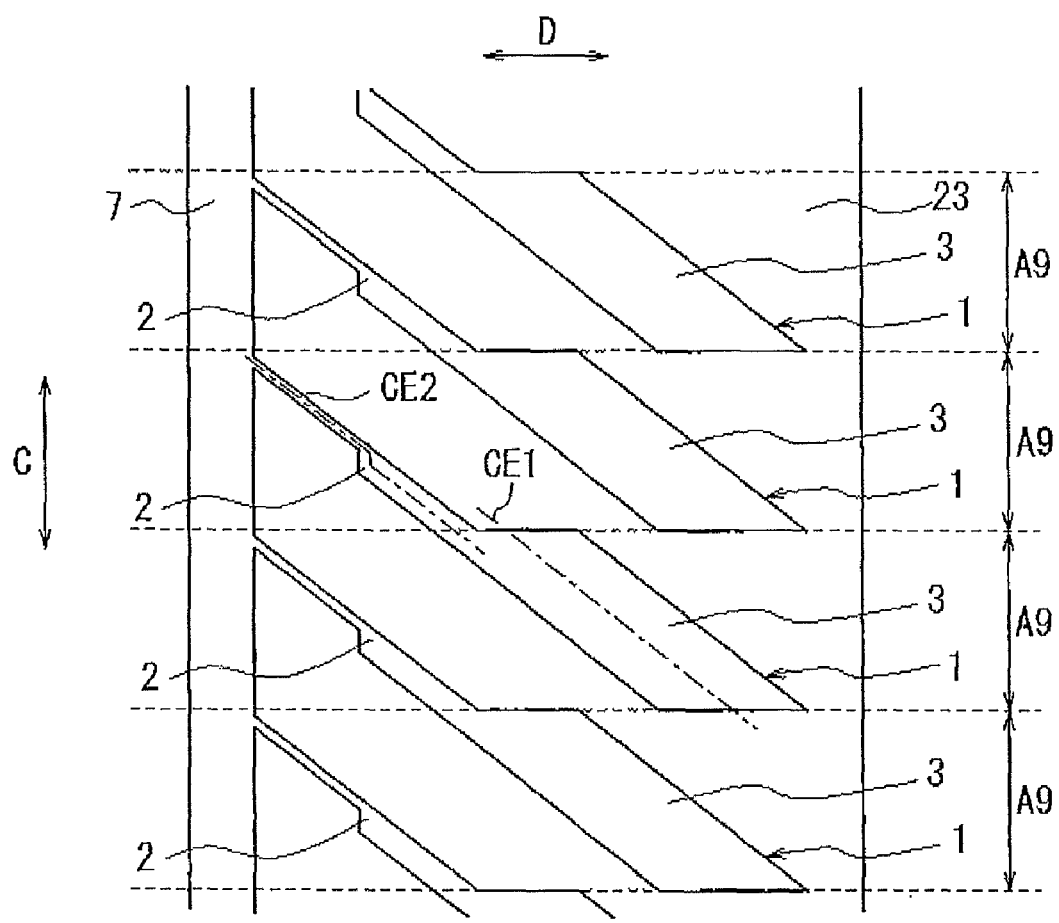
FIG. 30 is an enlarged plan view showing, in an enlarged manner, a main part of a tread portion of yet another tire according to the present invention.

Next, yet another embodiment according to the present invention will be described. FIG. 30 is an enlarged plan view showing in an enlarged manner a main portion of a tread portion of a tire of the yet another embodiment. The arrow C shown in the drawing represents the tire circumferential direction and the arrow D represents the tire widthwise direction. The same reference numerals are assigned to the same members as those of the tire of the foregoing embodiments.

The tire shown in FIG. 30 has a circumferential groove 7 extending in the tire circumferential direction and a rib-like land portion 23 adjacent thereto in a tread portion. Further, the tire has in the rib-like land portion 23 plural resonators 1 provided in the tire circumferential direction and constituted of a siping portion opened to the circumferential direction 7 and a resonance cell portion 3 communicating with the circumferential groove 7 via the siping portion 2, so that the resonators 1 decrease noise generated by resonance inside columns formed by the circumferential groove and a road surface. The resonance cell portion 3 is formed such that a sectional area of section thereof orthogonal to the center line CE1 is larger than a sectional area of a section of the siping portion 2 orthogonal to the center line CE2.

The main characteristic in structural terms of the tire of the present embodiment resides, as shown in FIG. 30, in that the resonance cell portion 3 of one resonator 1 completely overlaps the siping portion 2 of another resonator 1 adjacent to the one resonator 1 in the tire circumferential direction when viewed in the tire widthwise direction, i.e. when the resonance cell portion 3 and the siping portion 2 are projected onto the tire equatorial plane, the extension ranges in the tire circumferential direction of the respective projection shapes (not shown) coincide with each other.

According to the tire of the embodiment as shown in FIG. 30, when viewed in the tire widthwise direction, the resonance cell portion 3 of one resonator 1 completely overlaps the siping portion 2 of another resonator 1 adjacent to the one resonator 1 in the tire circumferential direction, so that the rib-like land portion 23 is constituted, when viewed in the tire widthwise direction, of only section A9 including the resonance cell portion 3 and the siping portion 2. Accordingly, a tire widthwise direction sectional area of the rib-like land portion 23 hardly changes along the tire circumference and thus rigidity of the rib-like land portion 23 along the tire circumference is made substantially even. As a result, pattern noise due to changes in rigidity of the rib-like land portion 23 along the tire circumference is further decreased.

In the tires of the embodiments as shown in FIGS. 25 to 30, it is preferable that the tire widthwise direction sectional area of the resonance cell portion 3 gradually decreases toward the first end 24, as exemplarily shown in FIG. 29. Due to this structure, rigidity of the rib-like land portion 23 can be smoothly increased toward the first end 24 and rapid change in rigidity can be prevented from occurring, whereby pattern noise due to changes in rigidity of the rib-like land portion 23 along the tire circumference is further decreased.

The foregoing descriptions only show a part of the embodiments of the present invention, and the structures described above can be combined with each other and/or various modifications may be added thereto unless such changes digress from the sprit of the present invention.

EXAMPLES

Experiment 1

Figure 31:
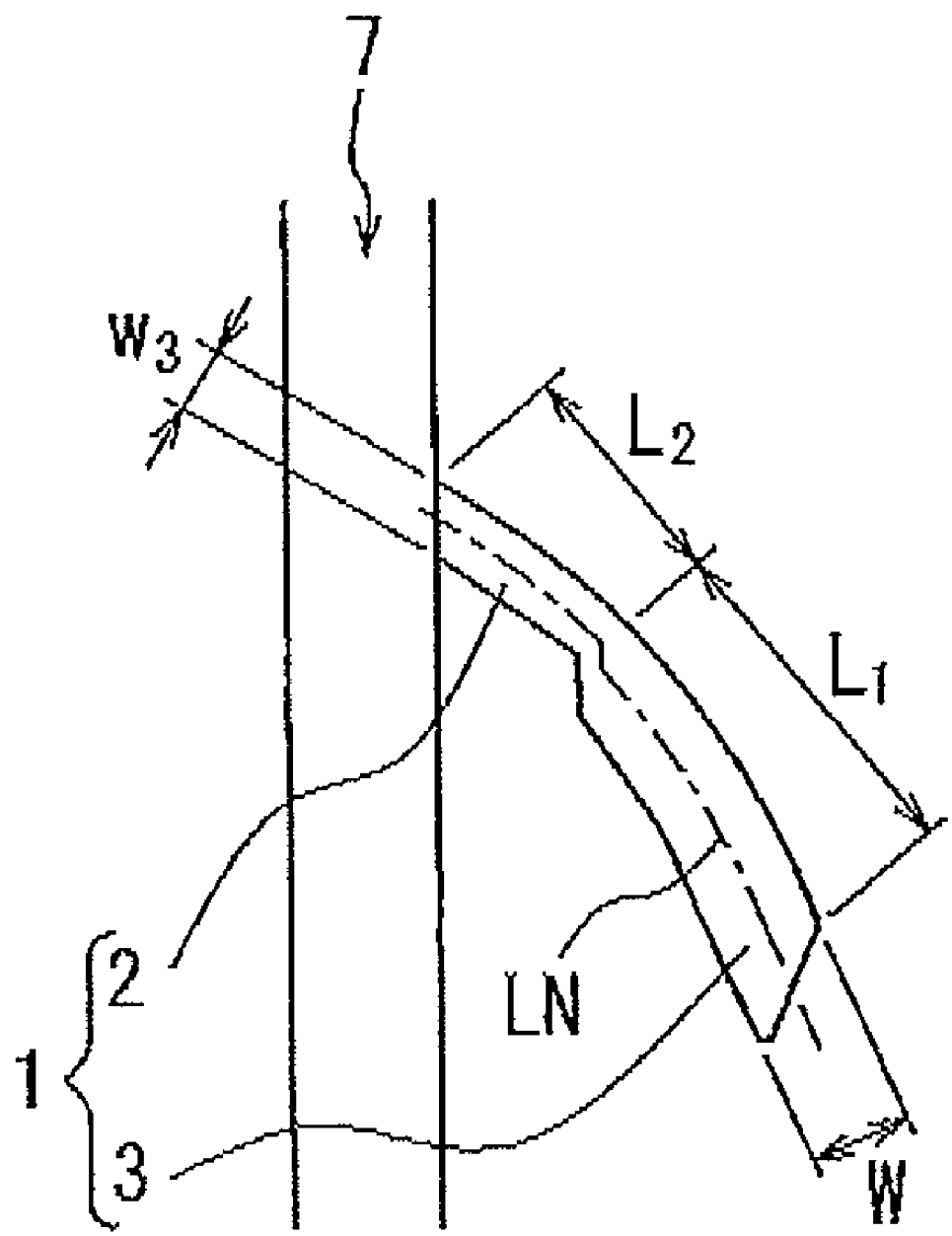
FIG. 31 is a plan view showing a resonator of a tire of Comparative Example.

In Experiment 1, a tire of the embodiment as shown in FIGS. 4 and 5 was prepared as Example 1 tire and, in order to make comparison with Example 1 tire, another tire was prepared as Comparative Example 1 tire which had, as shown in a plan view of FIG. 31, a resonator having the same depth and length as those of Example 1 tire and different from Example 1 tire only in that the width of the siping portion is constant in the longitudinal direction. Noises caused by these tires were measured. The measurement results are shown in FIG. 32 by a graph in which frequency and sound pressure are plotted on the longitudinal axis and the transverse axis, respectively.

The resonator of Comparative Example 1 has the width W of the resonance cell portion: 10 mm, the length $L_1$ thereof: 25 mm, the depth $D_1$ thereof: 8 mm, the width $W_3$ of the siping portion: 5 mm, the length $L_2$ thereof: 10 mm, and the depth $D_2$ thereof: 2 mm. The resonator of Example 1 tire has the width W of the resonance cell portion: 10 mm, the length $L_1$ thereof: 25 mm, the depth $D_1$ thereof: 8 mm, and the siping portion thereof is constituted of the circumferential groove side portion having the depth $D_2$: 2 mm, the width $w_1$: 3 mm, and the length $m_1$: 5 mm and the resonance cell side portion having the depth $D_2$: 2 mm, the width $w_2$: 5 mm, and the length $m_2$: 5 mm.

Figure 32:
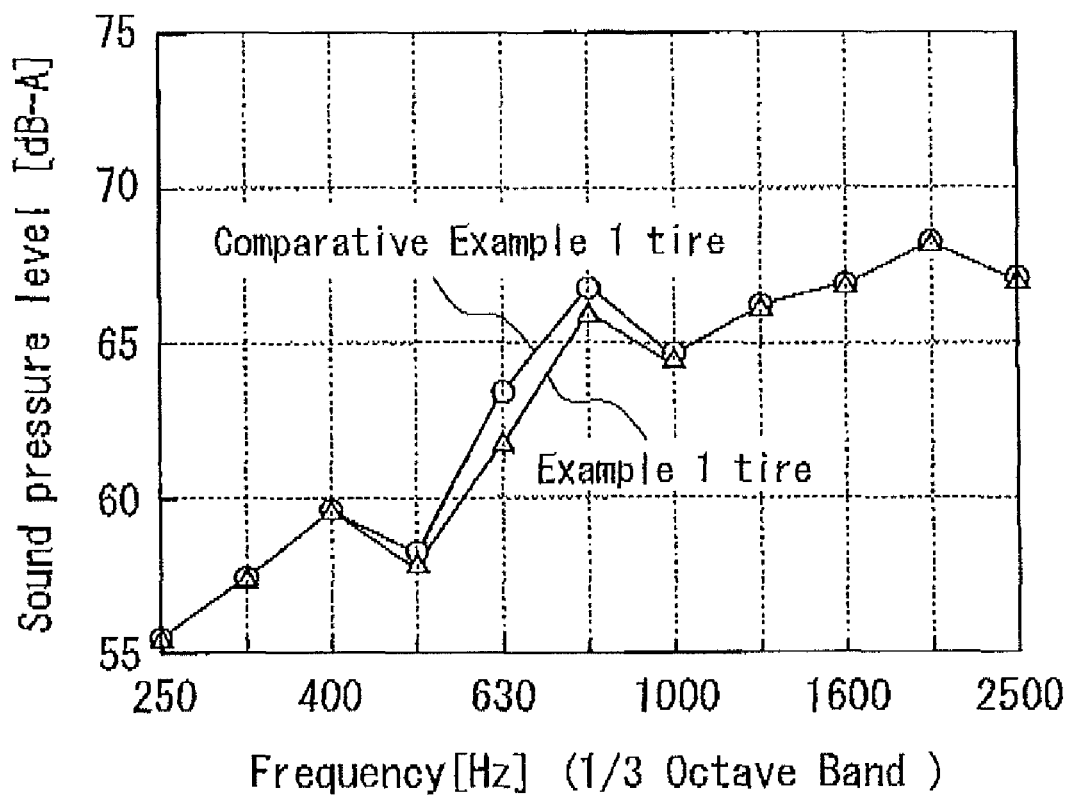
FIG. 32 is a graph showing a result of noise measurement.

The method of measuring noise included the steps of assembling each tire having size of 195/65R15 with a 6JJ rim; inflating the tire at an air pressure of 210 kPa; rotating the tire thus prepared by an indoor tire tester with exerting load of 4.4 kN thereon at a rate of 40 km/h; measuring lateral noise of the tire according to the conditions prescribed in JASO C606; and obtaining the values in the ⅓ octave band to plot a graph as show in FIG. 32.

The frequency of the noise caused by the striking sounds is 667 Hz from the calculation based on the conditions of the running speed: 40 km/h, the tire circumferential length size: 195/65R15, and the number of resonators: 60. As shown in FIG. 32, Example 1 tire obviously decreases the sound pressure level in this band range, as compared with Comparative Example 1 tire. On the other hand, the frequency band of the noise due to resonance sounds from the circumferential groove is in the range of 800 to 1200 Hz and there is substantially no difference in sound pressure level in this frequency range between Examples 1 and Comparative Example 1. Therefore, as is obvious from FIG. 32, the tire of the present invention can suppress occurrence of striking sounds without scarifying an effect of decreasing resonance sounds.

In following Example tires of Examples 2 to 6, various performances described below have been improved, based on optimizing the shape of the siping portion of a resonator to suppress generation of the aforementioned striking sounds.

Experiment 2

In Experiment 2, plural test tires were produced for each of Examples 2 to 6 according to the embodiment of the present invention, in which the length $L_4$ in the tire widthwise direction of a resonance cell portion of a resonator is not larger than the length $L_3$ in the tire circumferential direction thereof and each of Examples 7 to 9 according to the embodiment of the present invention, in which the length $L_4$ in the tire widthwise direction of a resonance cell portion of a resonator exceeds the length $L_3$ in the tire circumferential direction thereof. Noise and weight of wear of each of these tires were measured by following tests and the results thereof were comparatively evaluated.

The siping portion of the resonator of Examples 2 to 9 is constituted of a circumferential groove side portion having the depth $D_2$: 6 mm, the width $w_1$: 1.5 mm, and the length $m_1$: 20 mm; and a resonance cell side portion having the depth $D_2$: 6 mm, the width $w_2$: 2 mm, and the length $m_2$: 5 mm. Each of the tires employed in the tests had the size of 195/65R15, was assembled with a 6JJ rim and subjected to the following tests in a state where the tire was inflated at an air pressure of 210 kPa.

The method of measuring noise included the steps of: rotating each of the tires by an indoor tire tester at a rate of 80 km/h with exerting load of 4.47 kN; measuring lateral noise of the tire according to the conditions prescribed in JASO C606; and obtaining overall values of the center frequency band, i.e. 800 Hz-1000 Hz-1250 Hz, in the ⅓ octave band. The results are expressed as difference in decibel (dB) from the results of Conventional 1 tire, which is substantially the same as Examples tires as described below, except that Comparative Example 1 tire has no resonator.

The method of measuring the weight of wear included the steps of subjecting each of the tires to free rolling (running with no load exerted on the tire circumferential direction) as a first running for 10 minutes by an indoor tire tester (having Safety-walk surface attached thereto) at 80 km/h with exerting load of 4.47 kN; subjecting the tire to a second running for 10 minutes in which 0.1G (G represents gravitational acceleration) was applied in the braking direction; repeating the first running and the second running alternately; and after making the tire run 1200 km, measuring the amount of rubber wear. The measurement results are each shown by an index value with respect to the reference value 100, which is the amount of rubber wear of Conventional 1 tire, which is different from the Example tires only in that the former does not have any resonator. The larger index value represents the larger amount of wear and thus poorer wear resistance.

Regarding passed/failure determination of weight of wear, when the index value is not larger than 110, it is assumed that the performance of the tire may be slightly poorer than that of Conventional 1 tire but does not cause a significant problem, whereby the tire is classified to "Passed". When the index value is not larger than 105, in particular, it is judged that the performance of the tire is equivalent to that of Conventional tire. In contrast, when the index value exceeds 110, it is judged that the wear resistance property of the tire has obviously deteriorated and the tire is classified to "Failure".

Figure 33:
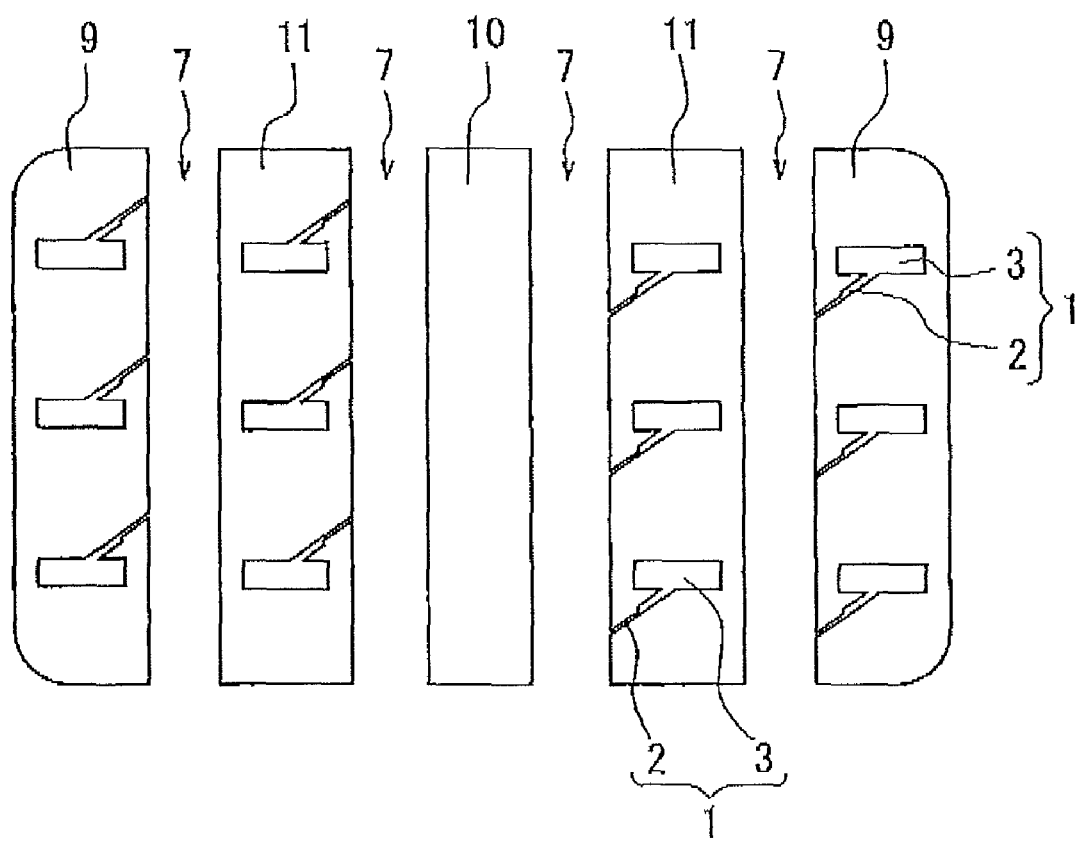
FIG. 33 is a view schematically showing a ground contact surface of a tread portion of an Example tire.
Figure 34:
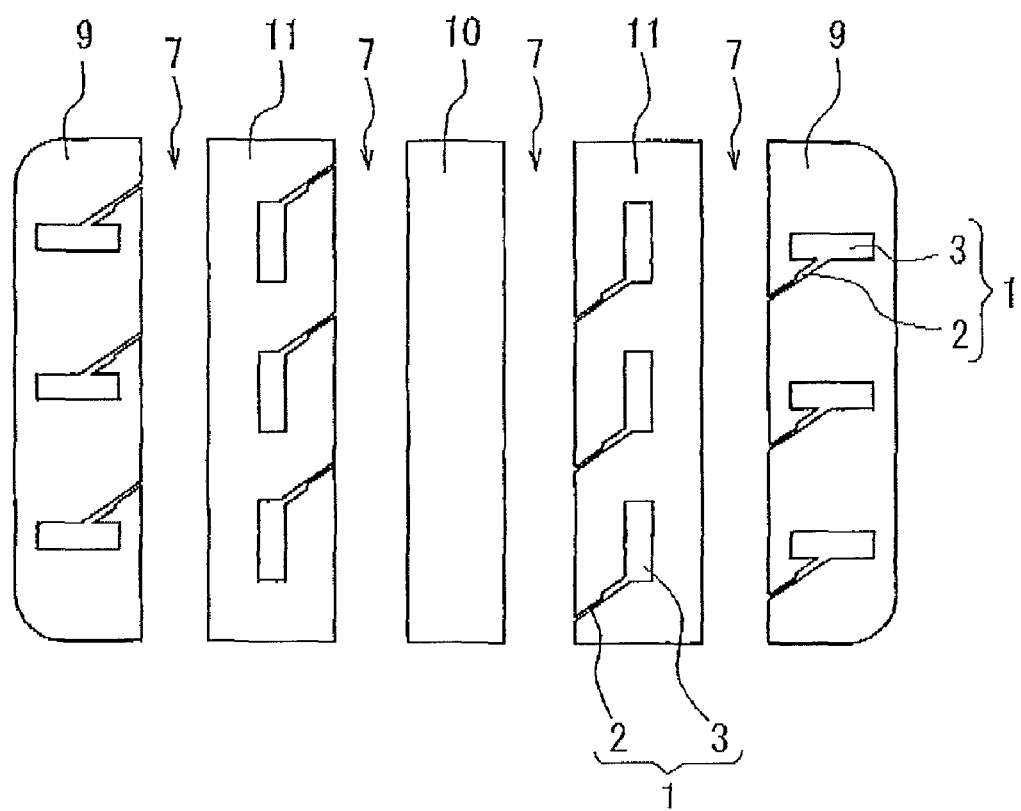
FIG. 34 is a view schematically showing a ground contact surface of a tread portion of an Example tire.

Example 2 tire is a tire having resonators structured to have the shape and the arrangement as shown in FIG. 7. Example 7 tire is a tire in which each of the resonators has the same opening dimension as that of the resonance cell portion of Example 2 tire and is disposed such that each resonator is rotated by 90° from the position in Example 2 tire, as shown in FIG. 33. Example 3 tire is a tire having the same resonators as Example 2 tire in a shoulder land portion thereof and the same resonators as Example 7 tire in the intermediate land portion thereof. Example 8 tire is a tire having the same resonators as Example 7 tire in a shoulder land portion thereof and the same resonators as Example 2 tire in the intermediate land portion thereof, as shown in FIG. 34. Noise and weight of wear were measured, respectively, according to the methods described above for each of these four types of tires.

In Example 2 tire, as shown in FIG. 7, the resonators opening to the respective circumferential grooves are disposed such that three resonators always exist in each of the rib-like land portions at a ground contact surface of the tread portion. The resonance cell portion constituting the resonator has a rectangular shape of the length $L_3$ in the tire circumferential direction: 18 mm, the length $L_4$ in the tire widthwise direction: 6 mm, the depth: 7 mm, and accordingly has the volume V: 756 $mm^3$.

The noise level and the weight of wear of Examples tires 2, 3, 7 and 8 were evaluated by the aforementioned test methods. The results are shown in Table 1.

TABLE 1

| | Direction of resonance cell portion in shoulder land portion | Direction of resonance cell portion in intermediate land portion | Noise level [dB] | Amount of wear |
|---|---|---|---|---|
| Example tire 2 | Tire circumferential direction | Tire circumferential direction | −2.6 | 102 |
| Example tire 3 | Tire circumferential direction | Tire widthwise direction | −2.5 | 101 |
| Example tire 7 | Tire widthwise direction | Tire widthwise direction | −2.5 | 120 |
| Example tire 8 | Tire widthwise direction | Tire circumferential direction | −2.5 | 110 |

As is obvious from Table 1, it is understand that, although all of the tires of Examples 2, 3, 7 and 8 have substantially the same resonance sound suppressing effect, only the tires in which the length L in the tire circumferential direction of the resonance cell portion provided in the shoulder land portion is larger than the length $L_4$ in the tire widthwise direction of the same resonance cell portion have achieved the "Passed" level in terms of the weight of wear.

Further, in addition to Example 2 tire and Example 7 tire, there were prepared test tires of Examples 4-6 and 9 which are different from Example 2 tire only in the length $L_3$ in the tire circumferential direction and the length $L_4$ in the tire widthwise direction of the resonance cell portion. Each of these tires was subjected to measurements of noise and amount of wear according to the methods described above. The measurement results and the dimension of an opening portion of the resonance cell portion, of the tires of Examples 2, 4 to 7 and 9, are shown in Table 2.

In the respective Examples shown in Table 2, the length $L_3$ in the tire circumferential direction and the length $L_4$ in the tire widthwise direction are set such that the product thereof, i.e. the area of the opening portion of the resonance cell portion, is constant and thus the volume of the resonance cell portion is constant. In each of the Examples, the depth of the resonance cell portion is 7 mm. Accordingly, the resonance frequency $f_0$ values in these Examples are substantially equal to each other.

TABLE 2

| | Length $L_4$ in tire widthwise direction of resonance cell portion [mm] | Length $L_3$ in tire circumferential direction of resonance cell portion [mm] | $L_4/L_3$ | Noise level [dB] | Amount of wear |
|---|---|---|---|---|---|
| Example tire 4 | 4 | 27 | 0.15 | −2.5 | 100 |
| Example tire 2 | 6 | 18 | 0.33 | −2.6 | 102 |
| Example tire 5 | 9 | 12 | 0.75 | −2.6 | 105 |
| Example tire 6 | 10.4 | 10.4 | 1 | −2.6 | 110 |
| Example tire 9 | 12 | 9 | 1.33 | −2.5 | 112 |
| Example tire 7 | 18 | 6 | 3 | −2.5 | 120 |

As is obvious from Table 2, by setting $L_4/L_3$ at a value not larger than 1, the amount of wear can be kept within the "Passed" range, while the noise level is effectively decreased. In particular, by setting $L_4/L_3$ at a value not larger than 0.75, the amount of wear can be kept within a more preferable range.

Experiment 3

In Experiment 3, there were prepared a test tire lacking a shoulder groove but having the resonator according to the present invention (Example 10 tire) and test tires each having the resonator and a shoulder groove according to the present invention (Example 11 tire and Example 12 tire), as radial tires for a passenger vehicle having tire size of 225/55R17, respectively. The performances of these tires were evaluated. The details thereof will be described below.

The siping portion of the resonator of each of the tires of Examples 10 to 12 is constituted of a circumferential groove side portion having the depth $D_2$: 5 mm, the width $w_1$: 1.5 mm, and the length $m_1$: 15 mm; and a resonance cell side portion having the depth $D_2$: 5 mm, the width $w_2$: 2 mm, and the length $m_2$: 5 mm. Example 10 tire has a circumferential groove, and a resonator provided in a land portion on the inner side in the tire widthwise direction of the circumferential groove such that the resonator opens to the circumferential groove. The characteristics of Example 10 tire are shown in Table 3. Each of Example 11 tire and Example 12 tire has a circumferential groove, a resonator provided in a land portion on the inner side in the tire widthwise direction of the circumferential groove such that the resonator opens to the circumferential groove, and a shoulder groove provided between the adjacent resonators when viewed in the tire circumferential direction. The characteristics of the tires of Examples 11 and 12 are shown in Table 3. The volume of the resonance cell portion is expressed by an index value with respect to the reference volume which is the volume of the resonance cell portion of each resonator in Example 10 tire. The smaller index value represents the smaller volume of the resonance cell portion.

TABLE 3

| | Example 10 tire | Example 11 tire | Example 12 tire |
|---|---|---|---|
| Provision number of circumferential groove | 4 | 4 | 4 |
| Groove width of circumferential groove | 10 mm | 10 mm | 10 mm |
| Length in tire circumferential direction of resonance cell portion | 13 mm | 9 mm | 6 mm |
| Length in tire widthwise direction of resonance cell portion | 12 mm | 6 mm | 5 mm |
| Depth of resonance cell portion | 7 mm | 5 mm | 4 mm |
| Volume of resonance cell portion (expressed by index value) | 100 | 25 | 11 |
| Circumferential pitch number of shoulder groove | — | 28 | 42 |
| Number of shoulder groove in ground contact surface | — | 1 | 2 |
| Circumferential pitch number of resonator | 14 | 28 | 42 |
| Number of resonator in ground contact surface | 1 | 2 | 3 |

Each of these test tires was assembled with a rim having size of 7.5J×17.0 to be a tire wheel assembly. Various tests were conducted in a state where each of these tire assemblies was mounted to a vehicle, inflated at an air pressure of 220 kPa (relative pressure) with load of 5.0 kN exerted thereon, so that performances of the tire were evaluated.

In a test for evaluating quietness of the tire, the testing vehicle ran at a speed ranging from a relatively low speed to 100 km/h on a test course constituted of a circular course including a relatively long linear portion, a handling evaluation road including a lot of gentle curves, and the like, and a professional driver evaluated how easily pipe resonance sounds were heard and how annoying the sounds were, with 10 points as the full score. The larger points represent the better quietness. The evaluation results of quietness are shown in Table 4.

In a test for evaluating driving stability of the tire on a dry road surface, the testing vehicle ran at a speed ranging from a relatively low speed to 100 km/h on a test course constituted of a circular course including a relatively long linear portion, a handling evaluation road including a lot of gentle curves, and the like, and a professional driver evaluated driving stability on a dry road surface, with 10 points as the full score. The larger points represent the better driving stability on a dry road surface. The evaluation results of driving stability on a dry road surface are shown in Table 4.

In a test for evaluating a driving stability of the tire on a wet road surface, the testing vehicle ran on a wet road surface of a test course constituted of a handling evaluation road including a lot of upslope curves and downslope curves at as high a speed as possible (at the limit speed), and a professional driver evaluated driving stability on a wet road surface including gripping property, handling property and the like, with points as the full score. The larger points represent the better driving stability on a wet road surface. The evaluation results of driving stability on a wet road surface are shown in Table 4.

TABLE 4

|  | Example 10 tire | Example 11 tire | Example 12 tire |
|---|---|---|---|
| Quietness | 7 | 7 | 7 |
| Driving stability on a dry road surface | 6 | 6.5 | 6.75 |
| Driving stability on a wet road surface | 6.5 | 6.75 | 7 |

As is obvious from the results of Table 4, the tires of Examples 11 and 12 exhibit improved driving stability on a dry road surface, while decreasing pipe resonance sounds to a degree similar to that in Example 10 tire, as compared with Example 10. Example 12 tire exhibits better driving stability on a dry road surface than Example 11 tire because the number of shoulder grooves present within a ground contact surface of the former is larger than that of the latter and thus the volume of the resonance cell portion of the former is smaller than that of the latter. Further, the tires of Examples 11 and 12 exhibit improved driving stability on a wet road surface, as compared with Example 10 tire. Example 12 tire exhibits better driving stability on a wet road surface than Example 11 tire because the number of shoulder grooves present within a ground contact surface of the former is larger than that of the latter.

As is obvious from the foregoing descriptions, by optimizing a tread pattern, as well as the dimension and the position of a resonator provided at a ground contact surface of the tread, it is possible to provide a pneumatic tire capable of improving driving stability, while decreasing pipe resonance sounds during running of the tire.

Experiment 4

Further, in Experiment 4, there were prepared: Example 13 tire including a resonator not having an enlarged portion in the siping portion thereof, according to the present invention; and Example 14 tire including a resonator having an enlarged portion in the siping portion thereof, according to the present invention, as radial tires for a passenger vehicle having tire size of 225/55R17, respectively. The performances of these tires were evaluated. The details thereof will be described below.

Figure 35:
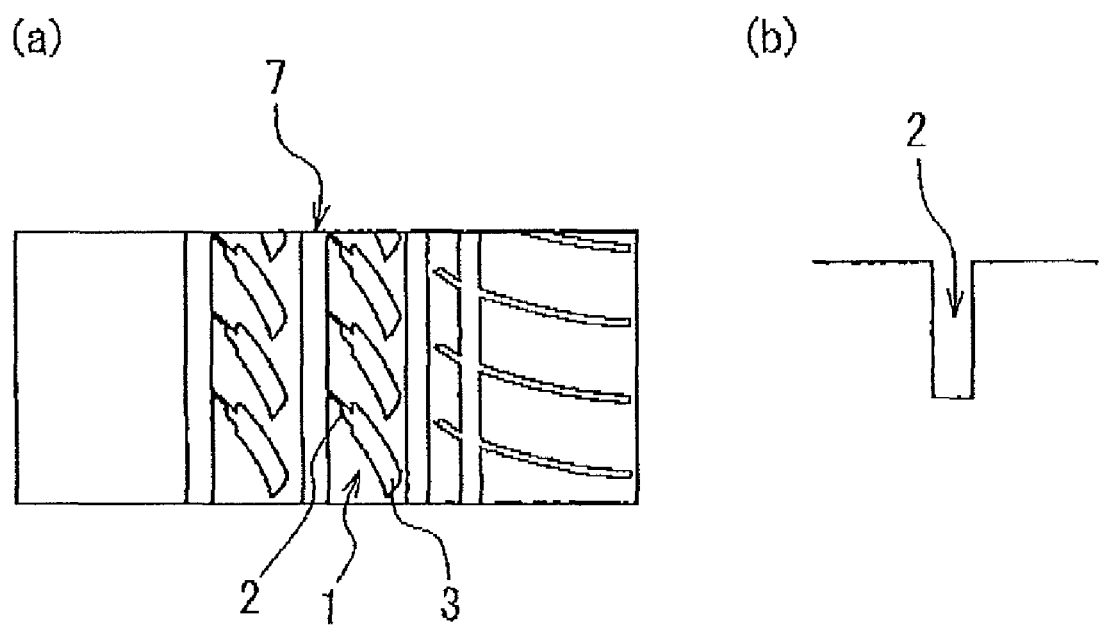
FIG. 35(a) is a development view of a part of a tread portion of an Example tire.
FIG. 35(b) is a view of a section of the siping portion in the direction orthogonal to the extending direction thereof, of an Example tire.

The siping portion of the resonator of each of the tires of Examples 13 to 14 is constituted of a circumferential groove side portion having the depth $D_2$: 6 mm, the width $w_1$: 1.5 mm, and the length $m_1$: 20 mm; and a resonance cell side portion having the depth $D_2$: 6 mm, the width $w_2$: 2 mm, and the length $m_2$: 5 mm. Example 13 tire has a tread pattern as shown in FIG. 35($a$) including plural circumferential grooves and resonators each opening to the circumferential groove. The siping portion of the resonator has, as shown in FIG. 35($b$), a sectional shape orthogonal to the extending direction of the siping portion. Example 13 tire has the characteristics as shown in Table 5.

Figure 36:
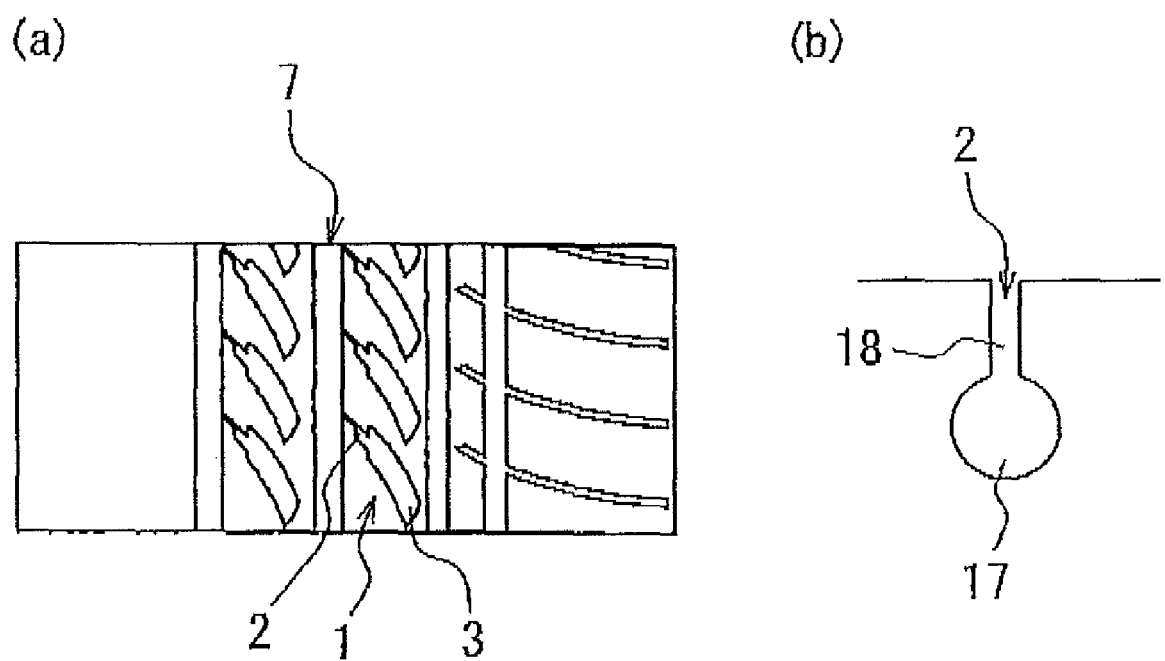
FIG. 36(a) is a development view of a part of a tread portion of an Example tire.
FIG. 36(b) is a view of a section of the siping portion in the direction orthogonal to the extending direction thereof, of an Example tire.

Further, Example 14 tire has a tread pattern as shown in FIG. 36($a$) including plural circumferential grooves and resonators each opening to the circumferential groove. The siping portion of the resonator has, as shown in FIG. 36($b$), in a sectional shape orthogonal to the extending direction of the siping portion, a groove width constant portion and an enlarged portion having a cylindrical shape. Example 14 tire has the characteristics as shown in Table 5.

TABLE 5

|  | Example 13 tire | Example 14 tire |
|---|---|---|
| Length in lateral direction of resonance cell portion | 6.0 mm | 6.0 mm |
| Length in longitudinal direction of resonance cell portion | 18.0 mm | 18.0 mm |
| Depth of resonance cell portion | 7.0 mm | 7.0 mm |
| Radius of enlarged portion having cylindrical shape | — | 1.2 mm |

Each of these test tires was assembled with a rim having size of 7.5J×17 to be a tire wheel assembly. Various evaluations were conducted in a state where each of these tire assemblies was mounted to a vehicle and inflated at an air pressure of 220 kPa (relative pressure) with load corresponding to the weight of two occupants exerted thereon.

Quietness of the tire was evaluated as a feeling evaluation in which a professional driver ran the testing vehicle at a speed ranging from a relatively low speed to 100 km/h on a test course in a state where a brand new tire was mounted thereon and a state where a worn tire was mounted thereon, respectively, and evaluated how easily pipe resonance sounds were heard and how annoying the sounds were, with 10 points as the full score. The evaluation results of quietness are shown in Table 6.

Further, the drainage property was evaluated by: a professional driver's running the testing vehicle at a gradually accelerating speed on a test course where the water depth was 10 mm in a state where a brand new tire was mounted on the vehicle and a state where a worn tire was mounted on the vehicle, respectively; determining the speed at which a slip rate of the tire with respect to a road surface reached 15%, as the hydroplaning occurring speed; and expressing the hydroplaning occurring speed thus obtained by an index value with respect to the reference value 100, which is the hydroplaning occurring speed of Example 13 tire in a brand new state, thereby making comparative evaluation. The larger index value represents the better drainage property. The evaluation results of drainage property are shown in Table 6.

TABLE 6

|  | Example 13 tire | | Example 14 tire | |
| --- | --- | --- | --- | --- |
|  | Brand new state | Worn state | Brand new state | Worn state |
| Quietness | 7 | 6.5 | 7.25 | 6.75 |
| Drainage property | 100 | 90 | 100 | 93 |

As is obvious from the results of Table 6, pipe resonance sounds of Example 14 tire were decreased in both brand new state and worn state, as compared with Example 13 tire.

Further, Example 14 tire exhibits improved anti-hydroplaning property in a worn state, as compared with Example 13 tire.

As is obvious from the foregoing descriptions, by optimizing the shape of a resonator, it is possible to provide a pneumatic tire capable of improving drainage property, while suppressing change in volume of a siping portion of the resonator due to deformation of a tread portion when the tire is rotated with load exerted thereon and thus decreasing pipe resonance sounds.

Experiment 5

Further, in Experiment 5, there were prepared: Example 15 tire including a resonator having a siping portion of which width is smaller on the circumferential groove side than on the resonance cell portion side, according to the present invention; and tires of Examples 16 to 20 tire including a resonator having a siping portion of which width is smaller on the circumferential groove side than on the resonance cell portion side and a resonance cell portion of various shapes, according to the present invention, as radial tires for a passenger vehicle having tire size of 225/55R17, respectively. The performances of these tires were evaluated. The details thereof will be described below.

The siping portion of the resonator of each of the tires of Examples 15 to 20 is constituted of a circumferential groove side portion having the depth $D_2$: 6 mm, the width $w_1$: 1.5 mm, and the length $m_1$; 25 mm; and a resonance cell side portion having the depth $D_2$: 6 mm, the width $w_2$: 2 mm, and the length $m_2$: 5 mm. Example 15 tire has four circumferential grooves and conventional resonators opening to these circumferential grooves in a ground contact surface of a tread portion. Example 15 tire further has the characteristics as shown in Table 7. Each of the tires of Examples 16 to has four circumferential grooves and resonators opened to these circumferential grooves and including resonance cell portions of various shapes in a ground contact surface of a tread portion. The tires of Examples 16 to 20 further have the characteristics as shown in Table 7, respectively.

TABLE 7

|  | Example 15 tire | Example 16 tire | Example 17 tire | Example 18 tire | Example 19 tire | Example 20 tire |
| --- | --- | --- | --- | --- | --- | --- |
| Width of resonance cell portion | 4 mm | 8 mm | 4.8 mm | 6 mm | 8 mm | 10 mm |
| Length of resonance cell portion | 27 mm | 13.5 mm | 27 mm | 36 mm | 27 mm | 22 mm |
| Depth of resonance cell portion | 7 mm | 7 mm | 7 mm | 7 mm | 7 mm | 7 mm |
| Sectional shape in the widthwise direction of resonance cell portion | Rectangular | Rectangular | Reverse trapezoidal | Triangular | Triangular | Triangular |
| Extending angle of wall portion | 0° | 0° | 0°/13° | 24° | 30° | 35° |
| Groove width of circumferential groove | 10 mm | 10 mm | 10 mm | 10 mm | 10 mm | 10 mm |
| Circumferential pitch number of resonator | 54 pitch | 54 pitch | 54 pitch | 54 pitch | 54 pitch | 54 pitch |
| Number of resonator in ground contact surface | 3 | 3 | 3 | 3 | 3 | 3 |

Each of these test tires was assembled with a rim having size of 7.5J×17.0 to be a tire wheel assembly. Various tests were conducted in a state where each of these tire assemblies was mounted to a vehicle, inflated at an air pressure of 220 kPa (relative pressure) with load of 5.0 kN exerted thereon, so that performances of the tire were evaluated.

A test for evaluating the pebble-biting-preventing property was conducted by: running a test vehicle 600 m on an unpaved road of approximately 300 m circuit having pebbles and gravels of diameters in the range of 1 to 10 mm or so laid thereon; then running the test vehicle 2000 m on a paved road including a straight road and a cornering road not having pebbles and gravels strewn thereon; counting the number of pebbles and gravels caught by the tire in the resonance cell portion; and expressing the obtained number by an index value with respect to the reference value, which is the number of pebbles and gravels caught by Example 15 tire in the resonance cell portion. The smaller value represents the better pebble-biting-preventing property. The evaluation results of the pebble-biting-preventing property are shown in Table 8.

In a test for evaluating quietness of the tire, the testing vehicle ran at a speed ranging from a relatively low speed to 100 km/h on a test course constituted of a circular course including a relatively long linear portion, a handling evaluation road including a lot of gentle curves, and the like, and a professional driver evaluated how easily pipe resonance sounds were heard and how annoying the sounds were, with 10 points as the full score. The larger points represent the better quietness. 7 points or higher represent that quietness sufficient for a driver is ensured during running of the vehicle. The evaluation results of quietness are shown in Table 8.

TABLE 8

| | Example 15 tire | Example 16 tire | Example 17 tire | Example 18 tire | Example 19 tire | Example 20 tire |
|---|---|---|---|---|---|---|
| Pebble-biting-preventing property | 100 | 40 | 65 | 50 | 30 | 20 |
| Quietness | 7 | 7 | 7 | 7 | 7 | 7 |

As is obvious from the results of Table 8, the tires of Examples 16 to 20 exhibit improved pebble-biting-preventing property, while decreasing pipe resonance sounds, as compared with Example 15 tire. The tires of Examples 19 and 20, in particular, have been significantly improved in the pebble-biting-preventing property.

Therefore, as is obvious from the foregoing descriptions, by optimizing the shape of the resonator, it is possible to provide a pneumatic tire which is capable of improving the pebble-biting-preventing property, while decreasing pipe resonance sounds in running of the tire.

Experiment 6

Further, in Experiment 6, there were prepared: Conventional Example 1 tire not having a resonator; tires of Examples 21 to 23 in which the width of the siping portion is smaller on the circumferential groove side than on the resonance cell portion side and the first end of one resonator is distanced in the tire circumferential direction from the second end of another resonator; tires of Examples 24 and 25 in which the width of the siping portion is smaller on the circumferential groove side than on the resonance cell portion side and, when viewed in the tire widthwise direction, the resonance cell portion of one resonator at least partially overlaps the siping portion of another resonator adjacent to the one resonator in the tire circumferential direction; and tires of Examples 26 and 27 in which the width of the siping portion is smaller on the circumferential groove side than on the resonance cell portion side and the first end of one resonator is aligned with the second end of another resonator on the same line when viewed in the tire widthwise direction, as radial tires for a passenger vehicle having tire size of 225/55R17, respectively. The performances of these tires were evaluated. The details thereof will be described below.

Figure 37:
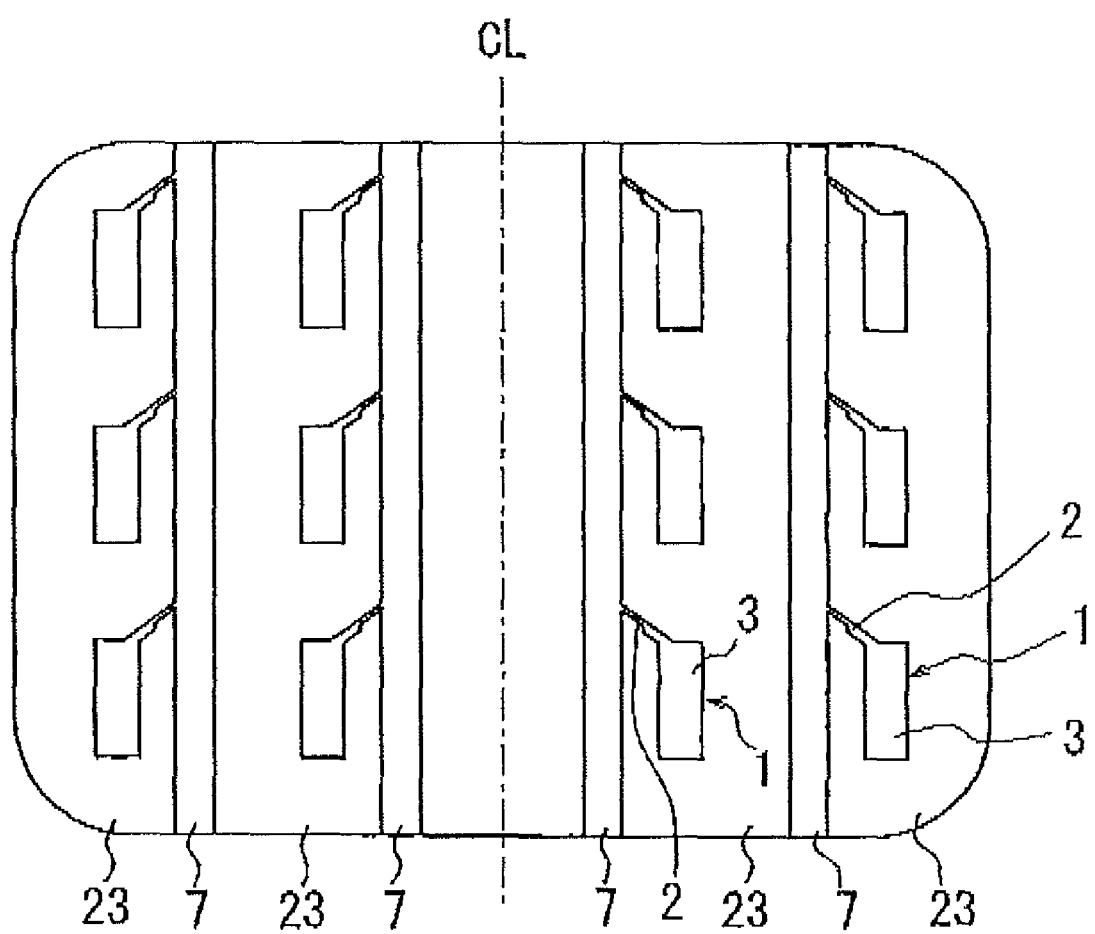
FIG. 37 is a view showing a tread pattern of an Example tire according to the present invention.
Figure 38:
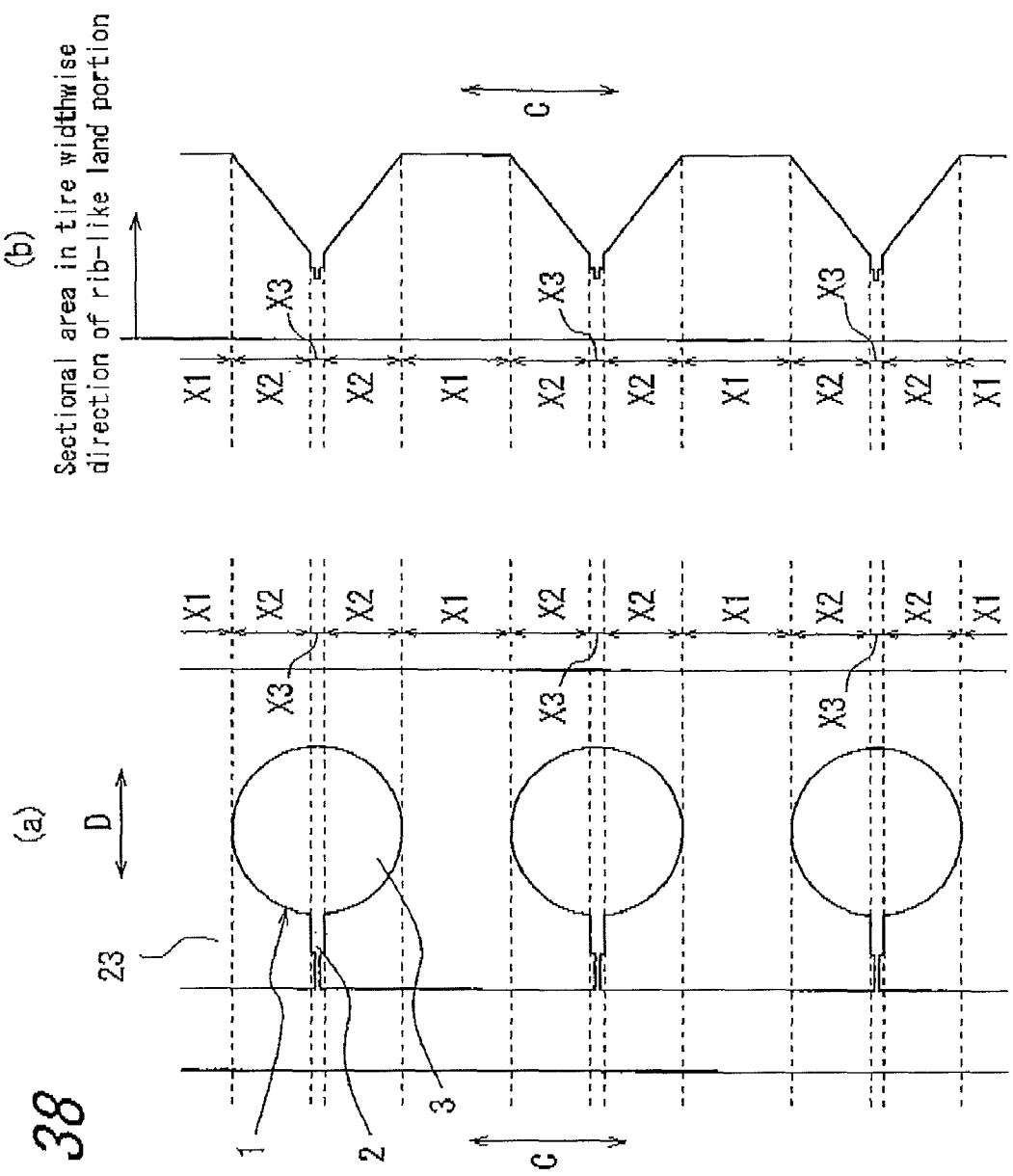
FIG. 38(a) is an enlarged plan view showing, in an enlarged manner, a main part of a tread portion of an Example tire.
FIG. 38(b) is a view showing change, in sectional area in the tire widthwise direction of a rib-like land portion of FIG. 38(a), along the circumference of the tire.

The siping portion of the resonator of each of the tires of Examples 21 to 26 is constituted of a circumferential groove side portion having the depth $D_2$: 6 mm, the width $w_1$: 1.5 mm, and the length $m_1$: 25 mm; and a resonance cell side portion having the depth $D_2$: 6 mm, the width $w_2$: 2 mm, and the length $m_2$: 5 mm. The siping portion of the resonator of Example 27 tire is constituted of a circumferential groove side portion having the depth $D_2$: 6 mm, the width $w_1$: 1.5 mm, and the length $m_1$: 20 mm; and a resonance cell side portion having the depth $D_2$: 6 mm, the width $w_2$: 2 mm, and the length $m_2$: 10 mm. Further, each of the tires of Examples 21 to 27 has, as shown in FIG. 37, four circumferential grooves and rib-like land portions adjacent thereto in the tread portion. The width and depth of the circumferential groove are 8 mm, respectively. As exemplarily shown in FIG. 37, each of these tires has 60 resonators in each rib-like land portion along the circumference of the tire. The shapes and arrangements of the respective resonators are shown in Table 9. The volume of the resonance cell portion of each of the resonators provided in the tires of Examples 21 to 26 is 840 mm$^3$ and the volume of the resonance cell portion of the resonator provided in Example 27 tire is 1260 mm$^3$. For comparison, Conventional Example 1 tire having the same structure as the tires of Examples 21 to 27, except that Conventional Example 1 tire lacks a resonator, was also prepared.

TABLE 9

Figure 39:
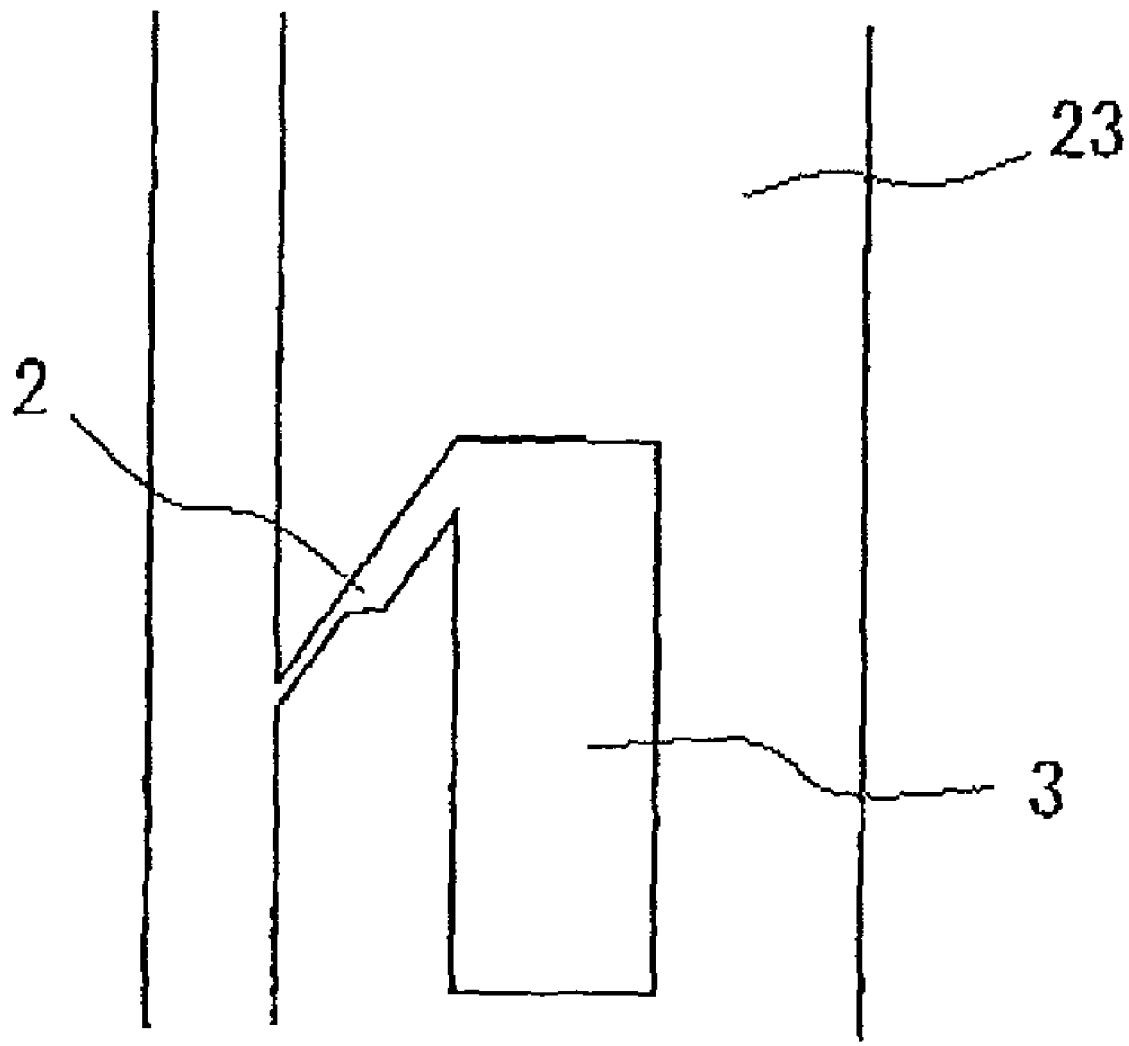
FIG. 39 is an enlarged plan view showing, in an enlarged manner, a main part of a tread portion of an Example tire.

| | Shape and arrangement of resonator |
|---|---|
| Conventional Example 1 tire | No resonator |
| Example 21 tire | FIG. 39 |
| Example 22 tire | FIG. 37 (FIG. 25) |
| Example 23 tire | FIG. 26 |
| Example 24 tire | FIG. 27 |
| Example 25 tire | FIG. 28 |
| Example 26 tire | FIG. 29 |
| Example 27 tire | FIG. 30 |

The method of measuring pipe resonance sounds and pattern noise included the steps of: assembling each of the tires with a rim having size of 7.5J; inflating the tire at an air pressure of 230 kPa (relative pressure); rotating each of the tires by an indoor tire tester at a rate of 60 km/h with exerting load of 4.5 kN; and measuring lateral noise of the tire according to the conditions prescribed in JASO C606. The pipe resonance sounds are evaluated by obtaining overall values of the center frequency band, i.e. 800 Hz-1000 Hz-1250 Hz, in the ⅓ octave band and expressing the overall values of Example tires 21 to 27 as relative values with respect to the corresponding value of Conventional Example 1 tire not having a resonator. In this evaluation, decrease in sound pressure by 1 dB or more, which can be regarded as an improving effect in the feeling evaluation by a professional driver's actual driving of the test vehicle, is judged to be "effective". Regarding pattern noise, the relative values of tires of Examples 22 to 27 with respect to Example 21 tire were obtained in a sound pressure in the pitch 1st harmonic frequency band, for evaluation. In this evaluation, decrease in sound pressure by 1 dB or more is judged to be "effective". The evaluation results of quietness are shown in Table 10.

TABLE 10

| | Pipe resonance sound (dB) | Pattern Noise (dB) |
|---|---|---|
| Conventional Example 1 tire | — | — |
| Example 21 tire | −2 | — |
| Example 22 tire | −2 | −1 |
| Example 23 tire | −2 | −2 |
| Example 24 tire | −2 | −2.5 |
| Example 25 tire | −2 | −3 |
| Example 26 tire | −2 | −3 |
| Example 27 tire | −1.5 | −4 |

From the results shown in Table 10, it has been confirmed that pattern noise can be further decreased, while pipe resonance sounds in running of the tire is decreased.

INDUSTRIAL APPLICABILITY

As is obvious from the foregoing descriptions, according to the present invention, rigidity of a land portion in the vicinity of a siping portion is made even by optimizing the shape and arrangement of a resonator, whereby it is possible to provide a pneumatic tire which is capable of effectively suppressing striking sounds generated when the siping portion is brought into contact with a road surface and improving various performances including drainage property and pebble-biting-preventing property described above.

The invention claimed is:

1. A pneumatic tire having: a circumferential groove continuously extending in the tire circumferential direction in a ground contact surface of a tread portion; and a resonator provided in a land portion and constituted of a resonance cell portion opened to a ground contact region at a position distanced from the circumferential groove and a siping portion for making the resonance cell portion communicate with the circumferential groove, characterized in that:
   an opening width of the siping portion at the ground contact surface of the tread portion is designed to change stepwise in the longitudinal direction thereof such that the opening width is relatively narrow on the side of the circumferential groove and relatively wide on the side of the resonance cell portion, and
   the resonance cell portion terminates in the land portion without communication with an another adjacent circumferential groove.

2. The pneumatic tire of claim 1, wherein, provided that the length in the tire circumferential direction and the length in the tire widthwise direction of the resonance cell portion of the resonator are $L_3$ and $L_4$, respectively, $L_4$ is not larger than $L_3$.

3. The pneumatic tire of claim 1, wherein the ground contact surface of the tread portion is provided with at least one shoulder groove extending from the circumferential groove toward the outer side in the tire widthwise direction thereof to a position beyond a ground contact end of the tread.

4. The pneumatic tire of claim 1, wherein a sectional area of a face of the resonance cell portion, which face is orthogonal to the extending direction of the resonance cell portion, is larger than a sectional area of a face of the siping portion, which face is orthogonal to the extending direction of the siping portion, and the siping portion has on the groove bottom side thereof an enlarged portion having a larger groove width than the opening width of the siping portion.

5. The pneumatic tire of claim 1, wherein a sectional area of a face of the resonance cell portion, which face is orthogonal to the extending direction of the resonance cell portion, is larger than a sectional area of a face of the siping portion, which face is orthogonal to the extending direction of the siping portion, and the depth of the resonance cell portion is not larger than the width of the resonance cell portion at the ground contact surface of the tread portion.

6. The pneumatic tire of any of claim 1, further comprising:
   at least one row of rib-like land portions adjacent to the circumferential groove,
   wherein a plurality of the resonators are provided along the tire circumferential direction in the rib-like land portion, and
   each resonator has a first end and a second end defining a length in the tire circumferential direction of the resonance cell portion, the siping portion extends from the second end of the resonator in the direction away from the first end of the resonator, and the first end of one resonator and the second end of another resonator adjacent to the one resonator in the tire circumferential direction are aligned with each other on the same line in the tire widthwise direction.

7. The pneumatic tire of claim 1, further comprising:
   at least one row of rib-like land portions adjacent to the circumferential groove,
   wherein a plurality of the resonators are provided along the tire circumferential direction in the rib-like land portion, and
   each resonator has a first end and a second end defining a length in the tire circumferential direction of the resonance cell portion, the siping portion extends from the second end of the resonator in the direction away from the first end of the resonator, and, when viewed in the tire widthwise direction, the resonance cell portion of one resonator at least partially overlaps the siping portion of another resonator adjacent to the one resonator in the tire circumferential direction.

8. The pneumatic tire of claim 1, further comprising:
   at least one row of rib-like land portions adjacent to the circumferential groove,
   wherein a plurality of the resonators are provided along the tire circumferential direction in the rib-like land portion, and
   each resonator has a first end and a second end defining a length in the tire circumferential direction of the resonance cell portion, the siping portion extends from the second end of the resonator in the direction away from the first end of the resonator, and the sectional area in the tire widthwise direction of the resonance cell portion gradually decreases toward the first end of the resonator.

9. The pneumatic tire of claim 1, wherein a length ($L_1$) of the resonance cell portion along the widthwise direction center line LN thereof is larger than a length of ($L_2$) of the siping portion along the widthwise direction center line LN thereof.

10. The pneumatic tire of claim 1, wherein a depth ($D_1$) of the resonance cell portion is larger than a depth ($D_2$) of the siping portion.

* * * * *